(12) United States Patent
Struthers et al.

(10) Patent No.: US 6,620,537 B2
(45) Date of Patent: Sep. 16, 2003

(54) HYDROCARBON FUELED HYDROGEN FUEL GENERATOR SYSTEM AND APPARATUS IN COMBINATION WITH HYDROGEN FUEL CELLS

(76) Inventors: Ralph C. Struthers, 1259 Jackie La., Santa Maria, CA (US) 93454; Georges A. Maxwell, 11362 Wallingsford Rd., Los Alamitos, CA (US) 90720

( * ) Notice: Subject to any disclaimer, the term of this patent is extended or adjusted under 35 U.S.C. 154(b) by 370 days.

(21) Appl. No.: 09/784,380

(22) Filed: Feb. 15, 2001

(65) Prior Publication Data

US 2002/0110712 A1 Aug. 15, 2002

(51) Int. Cl.⁷ ............................................. H01M 8/18
(52) U.S. Cl. ........................... 429/19; 429/20; 429/24; 429/25; 429/26; 205/343; 205/637; 422/188; 422/189; 422/190; 422/198; 422/200
(58) Field of Search ............................ 429/12, 19, 20, 429/24, 25, 26; 205/343, 637; 422/188, 189, 190, 198, 200

(56) References Cited

U.S. PATENT DOCUMENTS

| | | | | |
|---|---|---|---|---|
| 4,946,667 A | * | 8/1990 | Beshty | 423/648.1 |
| 5,407,757 A | * | 4/1995 | Struthers | 429/26 |
| 5,429,886 A | * | 7/1995 | Struthers | 429/44 |
| 5,729,967 A | * | 3/1998 | Joos et al. | 60/39.06 |
| 5,932,181 A | * | 8/1999 | Kim et al. | 422/188 |
| 6,083,425 A | * | 7/2000 | Clawson et al. | 252/372 |
| 6,155,212 A | * | 12/2000 | McAlister | 123/3 |
| 6,190,623 B1 | * | 2/2001 | Sanger et al. | 422/192 |
| 6,223,843 B1 | * | 5/2001 | O'Connell et al. | 180/65.3 |
| 6,280,864 B1 | * | 8/2001 | Towler et al. | 429/19 |
| 6,299,994 B1 | * | 10/2001 | Towler et al. | 429/19 |
| 6,303,009 B1 | * | 10/2001 | Bossard | 204/228.4 |
| 6,436,562 B1 | * | 8/2002 | DuBose | 429/26 |

* cited by examiner

Primary Examiner—Bruce F. Bell
(74) Attorney, Agent, or Firm—Fulwider Patton Lee & Utecht, LLP

(57) ABSTRACT

A hydrocarbon fueled hydrogen generator and hydrogen fueled electric power generating system and apparatus comprising hydrocarbon fuel and oxidizer delivery and mixing apparatus, ignition and combustion apparatus igniting the mixture of fuel and oxidizer, apparatus receiving and conducting the gases of combustion through a sulfur absorbing unit and removing sulfur from the gases, a steam reformer unit reforming carbon monoxide gas into hydrogen gas and carbon dioxide gas, a carbon monoxide scavenger unit reforming residual carbon monoxide gas to hydrogen gas and carbon dioxide gas; apparatus receiving the hydrogen gas and carbon dioxide gas and operating to liquefy and separate the carbon dioxide gas from the hydrogen gas; and, structure to hold and deliver the liquid carbon dioxide to useful end; and structure to hold and deliver hydrogen gas to the anode of a hydrogen fueled electric power generating fuel cell.

14 Claims, 15 Drawing Sheets

Fig. 7

HYDROGEN GAS GENERATOR:         PROPANE AND AIR
ONE (1) GALLON OF PROPANE REFORMED INTO 1.34 POUNDS OF HYDROGEN GAS:

PARTIAL OXIDATION (PO) of a Hydrocarbon:
  1.00  $C_3H_8$    + 1.50 $O_2$ + 5.64 $N_2$ = 0.00 $CO_2$ + 3.00 CO + 4.00 $H_2$ + 5.64 $N_2$
  4.18 lbs.  +  4.55 lbs.+ 14.97 lbs. = 0.00 lbs. + 7.96 lbs. + 0.76 lbs. + 14.97 lbs.
    -54.440 Kcal
    -227.831 kJ    Exothermic reaction for Partial Oxidation of the Hydrocarbon Fuel.

SULFUR ABSORBENT (SA) MIXED METAL (M) OXIDES:

STEAM REFORMING (SR) of a Hydrocarbon:
  0.00 $CO_2$  +  3.00 CO + 4.00 $H_2$ + 3.77 $H_2O$ = 3.00 $CO_2$ + 7.00 $H_2$ + 0.77 $H_2O$
  0.00 lbs.  +  7.96 lbs.+ 0.76 lbs + 6.43 lbs. = 12.51 lbs.+ 1.34 lbs.+ 1.31 lbs.
      54.403 Kcal                    0.77 Gal.
      227.677 kJ    Endothermic reaction for Steam Reforming of the Hydrocarbon Fuel.

CARBON MONOXIDE SCAVENGER (CMS) MIXED METAL (M) OXIDES:

HYDROGEN, NITROGEN AND LIQUID CARBON DIOXIDE SEPARATOR (SEP):
  3.00 $CO_2$ + 7.00 $H_2$ + 5.64 $N_2$ 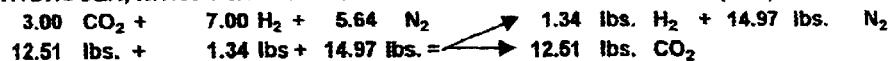 1.34 lbs. $H_2$ + 14.97 lbs. $N_2$
  12.51 lbs. + 1.34 lbs + 14.97 lbs. = 12.51 lbs. $CO_2$ POLYMER-ELECTROLYTE MEMBRANE FUEL CELL (PEM FC) ANODE (A):
      7.00 $H_2$  =  14.0 H  +  14.00 $e^-$
      14.11 MW =  14.1 MW
      1.34 lbs.

POLYMER-ELECTROLYTE MEMBRANE FUEL CELL (PEM FC) CATHODE (C):
      3.50  $O_2$ + 14.0 $H^+$  +  14.00 $e^-$ =  7.00 $H_2O$
      112.00  MW + 14.1 MW +      = 126.1 MW
      10.61  lbs.                     1.43 Gal.
    45% PEM FC EFFICIENCY GENERATING OF   8980 WATT HOURS PER ONE GALLON OF
  PROPANE AND     WATER REUTILIZATION OF   0.66 GALLONS.

ALKALINE-ELECTROLYTE FUEL CELL (ALK FC) ANODE: (A)
      7.00 $H_2$ +  14.0 $OH^-$ = 14.00 $H_2O$ + 14.00 $e^-$
      14.11 MW     238 MW =  252.2 MW
      1.34 lbs.              2.87 Gal.

ALKALINE-ELECTROLYTE FUEL CELL (ALK FC) CATHODE: (C)
      3.50  $O_2$ + 7.00 $H_2O$ + 14.00 $e^-$ =  14.00 $OH^-$
      112.00  MW + 126 MW +      = 238.1 MW
      10.61  lbs. + 1.43 Gal.
    70% ALK FC EFFICIENCY GENERATING OF   13969 WATT HOURS PER ONE GALLON OF
  PROPANE AND     WATER REUTILIZATION OF   0.66 GALLONS.

Fig. 8

HYDROGEN GAS GENERATOR:     PROPANE AND $H_2O_2$

ONE GALLON OF     PROPANE AND REFORMED INTO     1.59 POUNDS OF HYDROGEN GAS:
    0.671 GALLONS OF         60% HYDROGEN PEROXIDE =    7.3 lbs.

PARTIAL OXIDATION (PO) of a Hydrocarbon:
  1.00 $C_3H_8$ +     1.68 $H_2O_2$ +     1.12 $H_2O$ =    0.36 $CO_2$ +    2.64 CO +    1.12 $H_2O$ +    5.68 $H_2$
  4.18 lbs.    +     5.41 lbs.    +     1.91 lbs. =    1.48 lbs. +    7.02 lbs. +    1.91 lbs. +    1.08 lbs.
    -3.208 Kcal                                                                                                    0.23 Gal.
    -13.424 kJ     Exothermic reaction for Partial Oxidation of the Hydrocarbon Fuel.

SULFUR ABSORBENT (SA) MIXED METAL (M) OXIDES:

STEAM REFORMING (SR) of a Hydrocarbon:
  0.36 $CO_2$    +    2.64 CO +    2.66 $H_2O$ +    5.68 $H_2$ =    3.00 $CO_2$ +    0.02 $H_2O$ +    8.32 $H_2$
  1.48 lbs.    +    7.02 lbs. +    4.55 lbs. +    1.08 lbs. =    12.51 lbs. +    0.03 lbs. +    1.59 lbs.
    3.168 Kcal             0.5459 Gal.
    13.258 kJ     Endothermic reaction for Steam Reforming of the Hydrocarbon Fuel.

CARBON MONOXIDE SCAVENGER (CMS) MIXED METAL (M) OXIDES

HYDROGEN AND LIQUID CARBON DIOXIDE SEPARATOR (SEP)
  3.00 $CO_2$    +    8.32 $H_2$ =    →    1.59 lbs. $H_2$ +    0.00 lbs. $N_2$
  12.51 lbs.    +    1.59 lbs. =    →    12.51 lbs. $CO_2$ POLYMER-ELECTROLYTE MEMBRANE FUEL CELL (PEM FC) ANODE (A):
    8.32 $H_2$ =    16.64 $H^+$ +    16.64 $e^-$
    16.78 MW =    16.78 MW
    1.59 lbs.
POLYMER-ELECTROLYTE MEMBRANE FUEL CELL (PEM FC) CATHODE (C):
    4.16    $O_2$ +    16.64 $H^+$ +    16.64 $e^-$ =    8.32 $H_2O$
    133.15 MW +    16.78 MW +         =    149.9 MW
    12.61 lbs.                                            1.71 Gal.
  45% PEM FC EFFICIENCY GENERATING OF     10676 WATT HOURS PER ONE GALLON OF
PROPANE AND    WATER REUTILIZATION OF    1.39 GALLONS.

ALKALINE-ELECTROLYTE FUEL CELL (ALK FC) ANODE: (A)
    8.32 $H_2$ +    16.64 $OH^-$ =    16.64 $H_2O$ +    16.64 $e^-$
    16.78 MW    283.07 MW =    299.8 MW
    1.59 lbs.                       3.41 Gal.
ALKALINE-ELECTROLYTE FUEL CELL (ALK FC) CATHODE: (C)
    4.16    $O_2$ +    8.32 $H_2O$ +    16.64 $e^-$ =    16.64 $OH^-$
    133.15 MW +    149.92 MW +         =    283.1 MW
    12.61 lbs. +    1.7054 Gal.
  70% ALK FC EFFICIENCY GENERATING OF     16607 WATT HOURS PER ONE GALLON OF
PROPANE AND    WATER REUTILIZATION OF    1.39 GALLONS.

Fig. 9

HYDROGEN GAS GENERATOR: METHANOL AND AIR
ONE (1) GALLON OF METHANOL REFORMED INTO 1.04 POUNDS OF HYDROGEN GAS:

PARTIAL OXIDATION (PO) of a Hydrocarbon:
$$1.00\ CH_3OH + 0.25\ O_2 + 0.94\ N_2 = 0.50\ CO_2 + 0.50\ CO + 2.00\ H_2 + 0.94\ N_2$$
6.61 lbs. + 1.65 lbs.+ 5.43 lbs. = 4.54 lbs. + 2.89 lbs. + 0.83 lbs. + 5.43 lbs.
 -3.105 Kcal
 -12.994 kJ   Exothermic reaction for Partial Oxidation of the Hydrocarbon Fuel.

SULFUR ABSORBENT (SA) MIXED METAL (M) OXIDES:

STEAM REFORMING (SR) of a Hydrocarbon:
$$0.50\ CO_2 + 0.50\ CO + 2.00\ H_2 + 0.54\ H_2O = 1.00\ CO_2 + 2.50\ H_2 + 0.04\ H_2O$$
4.54 lbs. + 2.89 lbs.+ 0.83 lbs + 2.01 lbs. = 9.08 lbs.+ 1.04 lbs.+ 0.15 lbs.
 3.091 Kcal                 0.24 Gal.
 12.938 kJ   Endothermic reaction for Steam Reforming of the Hydrocarbon Fuel.

CARBON MONOXIDE SCAVENGER (CMS) MIXED METAL (M) OXIDES:

HYDROGEN, NITROGEN AND LIQUID CARBON DIOXIDE SEPARATOR (SEP):
$$1.00\ CO_2 + 2.50\ H_2 + 0.94\ N_2 \rightarrow 1.04\ lbs.\ H_2 + 5.43\ lbs.\ N_2$$
9.08 lbs. + 1.04 lbs + 5.43 lbs. = → 9.08 lbs. $CO_2$

POLYMER-ELECTROLYTE MEMBRANE FUEL CELL (PEM FC) ANODE (A):
$$2.50\ H_2 = 5.00\ H^+ + 5.00\ e^-$$
 5.04 MW = 5.04 MW
 1.04 lbs.

POLYMER-ELECTROLYTE MEMBRANE FUEL CELL (PEM FC) CATHODE (C):
$$1.25\ O_2 + 5.00\ H^+ + 5.00\ e^- = 2.50\ H_2O$$
 40.00 MW + 5.04 MW +       = 45.04 MW
 8.25 lbs.                   1.12 Gal.
 45% PEM FC EFFICIENCY GENERATING OF   6984 WATT HOURS PER ONE GALLON OF
 METHANOL AND WATER REUTILIZATION OF   0.88 GALLONS.

ALKALINE-ELECTROLYTE FUEL CELL (ALK FC) ANODE: (A)
$$2.50\ H_2 + 5.00\ OH^- = 5.00\ H_2O + 5.00\ e^-$$
 5.04 MW   85.04 MW = 90.08 MW
 1.04 lbs.           2.23 Gal.

ALKALINE-ELECTROLYTE FUEL CELL (ALK FC) CATHODE: (C)
$$1.25\ O_2 + 2.50\ H_2O + 5.00\ e^- = 5.00\ OH^-$$
 40.00 MW + 45.04 MW +    = 85.04 MW
 8.25 lbs. + 1.116 Gal.
 70% ALK FC EFFICIENCY GENERATING OF   10863 WATT HOURS PER ONE GALLON OF
 METHANOL AND WATER REUTILIZATION OF   0.88 GALLONS.

Fig. 10

HYDROGEN GAS GENERATOR: METHANOL AND $H_2O_2$

ONE GALLON OF METHANOL REFORMED INTO 1.09 POUNDS OF HYDROGEN GAS:
0.327 GALLONS OF 60% HYDROGEN PEROXIDE = 3.6 lbs.

PARTIAL OXIDATION (PO) of a Hydrocarbon:
$1.00\ CH_3OH + 0.38\ H_2O_2 + 0.25\ H_2O = 0.75\ CO_2 + 0.25\ CO + 0.25\ H_2O + 2.38\ H_2$
6.61 lbs. + 2.63 lbs. 0.93 lbs. = 6.81 lbs. + 1.44 lbs. + 0.93 lbs. + 0.99 lbs.
-3.182 Kcal 0.11 Gal.
-13.319 kJ Exothermic reaction for Partial Oxidation of the Hydrocarbon Fuel.

SULFUR ABSORBENT (SA) MIXED METAL (M) OXIDES:

STEAM REFORMING (SR) of a Hydrocarbon:
$0.75\ CO_2 + 0.25\ CO + 0.29\ H_2O + 2.38\ H_2 = 1.00\ CO_2 + 0.04\ H_2O + 2.63\ H_2$
6.81 lbs. + 1.44 lbs. + 1.09 lbs. + 0.99 lbs. = 9.08 lbs. + 0.16 lbs. + 1.09 lbs.
3.179 Kcal 0.131 Gal.
13.302 kJ Endothermic reaction for Steam Reforming of the Hydrocarbon Fuel.

CARBON MONOXIDE SCAVENGER (CMS) MIXED METAL (M) OXIDES

HYDROGEN AND LIQUID CARBON DIOXIDE SEPARATOR (SEP)
$1.00\ CO_2 + 2.63\ H_2 =$ → 1.09 lbs. $H_2$ + 0.00 lbs. $N_2$
9.08 lbs. + 1.09 lbs. = → 9.08 lbs. $CO_2$ POLYMER-ELECTROLYTE MEMBRANE FUEL CELL (PEM FC) ANODE (A):
$2.63\ H_2 = 5.25\ H + 5.25\ e^-$
5.29 MW = 5.29 MW
1.09 lbs.

POLYMER-ELECTROLYTE MEMBRANE FUEL CELL (PEM FC) CATHODE (C):
$1.31\ O_2 + 5.25\ H^+ + 5.25\ e^- = 2.63\ H_2O$
42.00 MW + 5.29 MW + = 47.3 MW
8.66 lbs. 1.17 Gal.

45% PEM FC EFFICIENCY GENERATING OF 7333 WATT HOURS PER ONE GALLON OF METHANOL AND WATER REUTILIZATION OF 1.15 GALLONS.

ALKALINE-ELECTROLYTE FUEL CELL (ALK FC) ANODE: (A)
$2.63\ H_2 + 5.25\ OH^- = 5.25\ H_2O + 5.25\ e^-$
5.29 MW 89.29 MW = 94.6 MW
1.09 lbs. 2.34 Gal.

ALKALINE-ELECTROLYTE FUEL CELL (ALK FC) CATHODE: (C)
$1.31\ O_2 + 2.63\ H_2O + 5.25\ e^- = 5.25\ OH^-$
42.00 MW + 47.29 MW + = 89.3 MW
8.66 lbs. + 1.171 Gal.

70% ALK FC EFFICIENCY GENERATING OF 11407 WATT HOURS PER ONE GALLON OF METHANOL AND WATER REUTILIZATION OF 1.15 GALLONS.

Fig. 11

HYDROGEN GAS GENERATOR:       GASOLINE AND AIR
ONE (1) GALLON OF GASOLINE , REFORMED INTO 1.76 POUNDS OF HYDROGEN GAS:

PARTIAL OXIDATION (PO) of a Hydrocarbon:
1.00 $C_8H_{18}$ + 4.00 $O_2$ + 15.04 $N_2$ = 0.00 $CO_2$ + 8.00 CO + 9.00 $H_2$ + 15.04 $N_2$
5.86 lbs. + 6.57 lbs.+ 21.62 lbs. = 0.00 lbs. + 11.50 lbs. + 0.93 lbs. + 21.62 lbs.
-151.620 Kcal
-634.530 kJ     Exothermic reaction for Partial Oxidation of the Hydrocarbon Fuel.

SULFUR ABSORBENT (SA) MIXED METAL (M) OXIDES:

STEAM REFORMING (SR) of a Hydrocarbon:
0.00 $CO_2$ + 8.00 CO + 9.00 $H_2$ + 10.14 $H_2O$ = 8.00 $CO_2$ + 17.00 $H_2$ + 2.14 $H_2O$
0.00 lbs. + 11.50 lbs.+ 0.93 lbs + 9.37 lbs. = 18.07 lbs.+ 1.76 lbs.+ 1.98 lbs.
151.588 Kcal                                1.12 Gal.
634.396 kJ     Endothermic reaction for Steam Reforming of the Hydrocarbon Fuel.

CARBON MONOXIDE SCAVENGER (CMS) MIXED METAL (M) OXIDES:

HYDROGEN, NITROGEN AND LIQUID CARBON DIOXIDE SEPARATOR (SEP):
8.00 $CO_2$ + 17.00 $H_2$ + 15.04 $N_2$ → 1.76 lbs. $H_2$ + 21.62 lbs. $N_2$
18.07 lbs. + 1.76 lbs + 21.62 lbs. = → 18.07 lbs. $CO_2$

POLYMER-ELECTROLYTE MEMBRANE FUEL CELL (PEM FC) ANODE (A):
17.00 $H_2$ = 34.00 $H^+$ + 34.00 $e^-$
34.27 MW = 34.27 MW
1.76 lbs.

POLYMER-ELECTROLYTE MEMBRANE FUEL CELL (PEM FC) CATHODE (C):
8.50 $O_2$ + 34.00 $H^+$ + 34.00 $e^-$ = 17.00 $H_2O$
271.99 MW + 34.27 MW +     = 306.3 MW
13.96 lbs.                  1.89 Gal.
45% PEM FC EFFICIENCY GENERATING OF 11815 WATT HOURS PER ONE GALLON OF
GASOLINE AND      WATER REUTILIZATION OF     0.76 GALLONS.

ALKALINE-ELECTROLYTE FUEL CELL (ALK FC) ANODE: (A)
17.00 $H_2$ + 34.00 $OH^-$ = 34.00 $H_2O$ + 34.00 $e^-$
34.27 MW    578.2 MW = 612.5 MW
1.76 lbs.              3.77 Gal.

ALKALINE-ELECTROLYTE FUEL CELL (ALK FC) CATHODE: (C)
8.50 $O_2$ + 17.00 $H_2O$ + 34.00 $e^-$ = 34.00 $OH^-$
271.99 MW + 306.3 MW +     = 578.2 MW
13.96 lbs. + 1.887 Gal.
70% ALK FC EFFICIENCY GENERATING OF 18378 WATT HOURS PER ONE GALLON OF
GASOLINE AND      WATER REUTILIZATION OF     0.76 GALLONS.

Fig. 12

HYDROGEN GAS GENERATOR: GASOLINE AND $H_2O_2$

ONE GALLON OF GASOLINE REFORMED INTO 2.12 POUNDS OF HYDROGEN GAS:
0.972 GALLONS OF 60% HYDROGEN PEROXIDE = 10.6 lbs.

PARTIAL OXIDATION (PO) of a Hydrocarbon:
$$1.00\ C8H18 + 4.49\ H_2O_2 + 2.99\ H_2O = 0.97\ CO_2 + 7.03\ CO + 2.99\ H_2O + 13.49\ H_2$$
5.86 lbs. + 7.83 lbs. 2.76 lbs. = 2.19 lbs. + 10.11 lbs. + 2.76 lbs. + 1.40 lbs.
-15.934 Kcal 0.33 Gal.
-66.685 kJ  Exothermic reaction for Partial Oxidation of the Hydrocarbon Fuel.

SULFUR ABSORBENT (SA) MIXED METAL (M) OXIDES:

STEAM REFORMING (SR) of a Hydrocarbon:
$$0.97\ CO_2 + 7.03\ CO + 7.19\ H_2O + 13.49\ H_2 = 8.00\ CO_2 + 0.16\ H_2O + 20.52\ H_2$$
2.19 lbs. + 10.11 lbs. + 6.65 lbs. + 1.40 lbs. = 18.07 lbs. + 0.15 lbs. + 2.12 lbs.
15.782 Kcal 0.798 Gal.
66.047 kJ  Endothermic reaction for Steam Reforming of the Hydrocarbon Fuel.

CARBON MONOXIDE SCAVENGER (CMS) MIXED METAL (M) OXIDES

HYDROGEN AND LIQUID CARBON DIOXIDE SEPARATOR (SEP)
$$8.00\ CO_2 + 20.52\ H_2 = 2.12\ lbs.\ H_2 + 0.00\ lbs.\ N_2$$
18.07 lbs. + 2.12 lbs. = 18.07 lbs. $CO_2$

POLYMER-ELECTROLYTE MEMBRANE FUEL CELL (PEM FC) ANODE (A):
$$20.52\ H_2 = 41.03\ H^+ + 41.03\ e^-$$
41.35 MW = 41.35 MW
2.12 lbs.

POLYMER-ELECTROLYTE MEMBRANE FUEL CELL (PEM FC) CATHODE (C):
$$10.26\ O_2 + 41.03\ H^+ + 41.03\ e^- = 20.52\ H_2O$$
328.23 MW + 41.36 MW + = 369.6 MW
16.85 lbs. 2.28 Gal.
45% PEM FC EFFICIENCY GENERATING OF 14257 WATT HOURS PER ONE GALLON OF GASOLINE AND WATER REUTILIZATION OF 1.81 GALLONS.

ALKALINE-ELECTROLYTE FUEL CELL (ALK FC) ANODE: (A)
$$20.52\ H_2 + 41.03\ OH^- = 41.03\ H_2O + 41.03\ e^-$$
41.35 MW 697.81 MW = 739.2 MW
2.12 lbs. 4.56 Gal.

ALKALINE-ELECTROLYTE FUEL CELL (ALK FC) CATHODE: (C)
$$10.26\ O_2 + 20.52\ H_2O + 41.03\ e^- = 41.03\ OH^-$$
328.23 MW + 369.58 MW + = 697.8 MW
16.85 lbs. + 2.28 Gal.
70% ALK FC EFFICIENCY GENERATING OF 22178 WATT HOURS PER ONE GALLON OF GASOLINE AND WATER REUTILIZATION OF 1.81 GALLONS.

Fig. 13

HYDROGEN GAS GENERATOR: KEROSENE AND AIR
ONE (1) GALLON OF KEROSENE REFORMED INTO 1.85 POUNDS OF HYDROGEN GAS:

PARTIAL OXIDATION (PO) of a Hydrocarbon:

$1.00\ C_{12}H_{26}\ +\ 6.00\ O_2\ +\ 22.56\ N_2\ =\ 0.00\ CO_2\ +\ 12.00\ CO\ +\ 13.00\ H_2\ +\ 22.56\ N_2$
6.25 lbs. + 7.05 lbs. + 23.19 lbs. = 0.00 lbs. + 12.33 lbs. + 0.96 lbs. + 23.19 lbs.
 −232.880 Kcal
 −974.603 kJ    Exothermic reaction for Partial Oxidation of the Hydrocarbon Fuel.

SULFUR ABSORBENT (SA) MIXED METAL (M) OXIDES:

STEAM REFORMING (SR) of a Hydrocarbon:

$0.00\ CO_2\ +\ 12.00\ CO\ +\ 13.00\ H_2\ +\ 15.28\ H_2O\ =\ 12.00\ CO_2\ +\ 25.00\ H_2\ +\ 3.28\ H_2O$
0.00 lbs. + 12.33 lbs. + 0.96 lbs + 10.10 lbs. = 19.38 lbs. + 1.85 lbs. + 2.17 lbs.
 232.370 Kcal                 1.21 Gal.
 972.467 kJ    Endothermic reaction for Steam Reforming of the Hydrocarbon Fuel.

CARBON MONOXIDE SCAVENGER (CMS) MIXED METAL (M) OXIDES:

HYDROGEN, NITROGEN AND LIQUID CARBON DIOXIDE SEPARATOR (SEP):

$12.00\ CO_2\ +\ 25.00\ H_2\ +\ 22.56\ N_2\ \rightarrow\ 1.85\ lbs.\ H_2\ +\ 23.19\ lbs.\ N_2$
19.38 lbs. + 1.85 lbs + 23.19 lbs. → 19.38 lbs. $CO_2$

POLYMER-ELECTROLYTE MEMBRANE FUEL CELL (PEM FC) ANODE (A):
 $25.00\ H_2\ =\ 50.00\ H^+\ +\ 50.00\ e^-$
 50.40 MW = 50.40 MW
 1.85 lbs.

POLYMER-ELECTROLYTE MEMBRANE FUEL CELL (PEM FC) CATHODE (C):
 $12.50\ O_2\ +\ 50.00\ H^+\ +\ 50.00\ e^-\ =\ 25.00\ H_2O$
 399.99 MW + 50.40 MW + = 450.4 MW
 14.68 lbs.                1.98 Gal.
 45% PEM FC EFFICIENCY GENERATING OF 12423 WATT HOURS PER ONE GALLON OF
 KEROSENE AND  WATER REUTILIZATION OF  0.77 GALLONS.

ALKALINE-ELECTROLYTE FUEL CELL (ALK FC) ANODE: (A)
 $25.00\ H_2\ +\ 50.00\ OH^-\ =\ 50.00\ H_2O\ +\ 50.00\ e^-$
 50.40 MW   850.4 MW = 900.8 MW
 1.85 lbs.           3.97 Gal.

ALKALINE-ELECTROLYTE FUEL CELL (ALK FC) CATHODE: (C)
 $12.50\ O_2\ +\ 25.00\ H_2O\ +\ 50.00\ e^-\ =\ 50.00\ OH^-$
 399.99 MW + 450.4 MW + = 850.4 MW
 14.68 lbs. + 1.984 Gal.
 70% ALK FC EFFICIENCY GENERATING OF 19324 WATT HOURS PER ONE GALLON OF
 KEROSENE AND  WATER REUTILIZATION OF  0.77 GALLONS.

*Fig. 14*

HYDROGEN GAS GENERATOR: KEROSENE AND $H_2O_2$

ONE GALLON OF KEROSENE REFORMED INTO 2.26 POUNDS OF HYDROGEN GAS:
1.007 GALLONS OF 60% HYDROGEN PEROXIDE = 11.0 lbs.

PARTIAL OXIDATION (PO) of a Hydrocarbon:
$$1.00\ C12H26 + 6.50\ H_2O_2 + 4.33\ H_2O = 1.00\ CO_2 + 11.00\ CO + 4.33\ H_2O + 19.50\ H_2$$
6.25 lbs. + 8.11 lbs. + 2.86 lbs. = 1.61 lbs. + 11.31 lbs. + 2.86 lbs. + 1.44 lbs.
-8.790 Kcal 0.34 Gal.
-36.786 kJ Exothermic reaction for Partial Oxidation of the Hydrocarbon Fuel.

SULFUR ABSORBENT (SA) MIXED METAL (M) OXIDES:

STEAM REFORMING (SR) of a Hydrocarbon:
$$1.00\ CO_2 + 11.00\ CO + 11.01\ H_2O + 19.50\ H_2 = 12.00\ CO_2 + 0.01\ H_2O + 30.50\ H_2$$
1.61 lbs. + 11.31 lbs. + 7.28 lbs. + 1.44 lbs. = 19.38 lbs. + 0.01 lbs. + 2.26 lbs.
8.501 Kcal 0.874 Gal.
35.576 kJ Endothermic reaction for Steam Reforming of the Hydrocarbon Fuel.

CARBON MONOXIDE SCAVENGER (CMS) MIXED METAL (M) OXIDES

HYDROGEN AND LIQUID CARBON DIOXIDE SEPARATOR (SEP)
12.00 $CO_2$ + 30.50 $H_2$ = ↗ 2.26 lbs. $H_2$ + 0.00 lbs. $N_2$
19.38 lbs. + 2.26 lbs. = ↘ 19.38 lbs. $CO_2$ POLYMER-ELECTROLYTE MEMBRANE FUEL CELL (PEM FC) ANODE (A):
30.50 $H_2$ = 61.00 $H^+$ + 61.00 $e^-$
61.48 MW = 61.48 MW
2.26 lbs.

POLYMER-ELECTROLYTE MEMBRANE FUEL CELL (PEM FC) CATHODE (C):
15.25 $O_2$ + 61.00 $H^+$ + 61.00 $e^-$ = 30.50 $H_2O$
487.98 MW + 61.49 MW + = 549.5 MW
17.91 lbs. 2.42 Gal.

45% PEM FC EFFICIENCY GENERATING OF 15156 WATT HOURS PER ONE GALLON OF KEROSENE AND WATER REUTILIZATION OF 1.89 GALLONS.

ALKALINE-ELECTROLYTE FUEL CELL (ALK FC) ANODE: (A)
30.50 $H_2$ + 61.00 $OH^-$ = 61.00 $H_2O$ + 61.00 $e^-$
61.48 MW 1037.4 MW = 1099 MW
2.26 lbs. 4.84 Gal.

ALKALINE-ELECTROLYTE FUEL CELL (ALK FC) CATHODE: (C)
15.25 $O_2$ + 30.50 $H_2O$ + 61.00 $e^-$ = 61.00 $OH^-$
487.98 MW + 549.46 MW + = 1037 MW
17.91 lbs. + 2.42 Gal.

70% ALK FC EFFICIENCY GENERATING OF 23575 WATT HOURS PER ONE GALLON OF KEROSENE AND WATER REUTILIZATION OF 1.89 GALLONS.

Fig. 15

HYDROGEN GAS GENERATOR: ETHANOL AND AIR
ONE (1) GALLON OF ETHANOL A REFORMED INTO 1.37 POUNDS OF HYDROGEN GAS:

PARTIAL OXIDATION (PO) of a Hydrocarbon:
  1.00 $C_2H_6O$ + 0.62 $O_2$ + 2.34 $N_2$ = 0.24 $CO_2$ + 1.76 CO + 3.00 $H_2$ + 2.34 $N_2$
  6.59 lbs. + 2.84 lbs.+ 9.36 lbs. = 1.53 lbs. + 7.03 lbs. + 0.86 lbs. + 9.36 lbs.
    -3.074 Kcal
    -12.865 kJ    Exothermic reaction for Partial Oxidation of the Hydrocarbon Fuel.

SULFUR ABSORBENT (SA) MIXED METAL (M) OXIDES:

STEAM REFORMING (SR) of a Hydrocarbon:
  0.24 $CO_2$ + 1.76 CO + 3.00 $H_2$ + 1.78 $H_2O$ = 2.00 $CO_2$ + 4.76 $H_2$ + 0.03 $H_2O$
  1.53 lbs. + 7.03 lbs.+ 0.86 lbs + 4.59 lbs. = 12.58 lbs.+ 1.37 lbs.+ 0.07 lbs.
    3.057 Kcal                      0.55 Gal.
    12.793 kJ    Endothermic reaction for Steam Reforming of the Hydrocarbon Fuel.

CARBON MONOXIDE SCAVENGER (CMS) MIXED METAL (M) OXIDES:

HYDROGEN, NITROGEN AND LIQUID CARBON DIOXIDE SEPARATOR (SEP):
  2.00 $CO_2$ + 4.76 $H_2$ + 2.34 $N_2$ → 1.37 lbs. $H_2$ + 9.36 lbs. $N_2$
  12.58 lbs. + 1.37 lbs + 9.36 lbs. → 12.58 lbs. $CO_2$ POLYMER-ELECTROLYTE MEMBRANE FUEL CELL (PEM FC) ANODE (A):
  4.76 $H_2$ = 9.51 H + 9.51 $e^-$
  9.59 MW = 9.59 MW
  1.37 lbs.

POLYMER-ELECTROLYTE MEMBRANE FUEL CELL (PEM FC) CATHODE (C):
  2.38 $O_2$ + 9.51 $H^+$ + 9.51 $e^-$ = 4.76 $H_2O$
  76.11 MW + 9.59 MW + = 85.70 MW
  10.88 lbs.                1.47 Gal.
  45% PEM FC EFFICIENCY GENERATING OF    9207 WATT HOURS PER ONE GALLON OF
  ETHANOL AND    WATER REUTILIZATION OF    0.92 GALLONS.

ALKALINE-ELECTROLYTE FUEL CELL (ALK FC) ANODE: (A)
  4.76 $H_2$ + 9.51 $OH^-$ = 9.51 $H_2O$ + 9.51 $e^-$
  9.59 MW    161.8 MW = 171.4 MW
  1.37 lbs.              2.94 Gal.

ALKALINE-ELECTROLYTE FUEL CELL (ALK FC) CATHODE: (C)
  2.38 $O_2$ + 4.76 $H_2O$ + 9.51 $e^-$ = 9.51 $OH^-$
  76.11 MW + 85.70 MW + = 161.8 MW
  10.88 lbs. + 1.471 Gal.
  70% ALK FC EFFICIENCY GENERATING OF    14321 WATT HOURS PER ONE GALLON OF
  ETHANOL AND    WATER REUTILIZATION OF    0.92 GALLONS.

Fig. 16

HYDROGEN GAS GENERATOR: ETHANOL AND $H_2O_2$

ONE GALLON OF ETHANOL AN REFORMED INTO 1.46 POUNDS OF HYDROGEN GAS:
0.561 GALLONS OF 60% HYDROGEN PEROXIDE = 6.1 lbs.

PARTIAL OXIDATION (PO) of a Hydrocarbon:
  1.00 $C_2H_6O$ + 0.93 $H_2O_2$ + 0.62 $H_2O$ = 0.86 $CO_2$ + 1.14 CO + 0.62 $H_2O$ + 3.93 $H_2$
  6.59 lbs. + 4.52 lbs. + 1.60 lbs. = 5.41 lbs. + 4.56 lbs. + 1.60 lbs. + 1.13 lbs.
  -3.063 Kcal                                                           0.19 Gal.
  -12.820 kJ    Exothermic reaction for Partial Oxidation of the Hydrocarbon Fuel.

SULFUR ABSORBENT (SA) MIXED METAL (M) OXIDES:

STEAM REFORMING (SR) of a Hydrocarbon:
  0.86 $CO_2$ + 1.14 CO + 1.17 $H_2O$ + 3.93 $H_2$ = 2.00 $CO_2$ + 0.03 $H_2O$ + 5.07 $H_2$
  5.41 lbs. + 4.56 lbs. + 3.02 lbs. + 1.13 lbs. = 12.58 lbs. + 0.08 lbs. + 1.46 lbs.
  3.041 Kcal       0.363 Gal.
  12.727 kJ    Endothermic reaction for Steam Reforming of the Hydrocarbon Fuel.

CARBON MONOXIDE SCAVENGER (CMS) MIXED METAL (M) OXIDES

HYDROGEN AND LIQUID CARBON DIOXIDE SEPARATOR (SEP)
  2.00 $CO_2$ + 5.07 $H_2$ = ↗ 1.46 lbs. $H_2$ + 0.00 lbs. $N_2$
  12.58 lbs. + 1.46 lbs. = ↘ 12.58 lbs. $CO_2$ POLYMER-ELECTROLYTE MEMBRANE FUEL CELL (PEM FC) ANODE (A):
  5.07 $H_2$ = 10.14 H + 10.14 $e^-$
  10.22 MW = 10.22 MW
  1.46 lbs.

POLYMER-ELECTROLYTE MEMBRANE FUEL CELL (PEM FC) CATHODE (C):
  2.54 $O_2$ + 10.14 $H^+$ + 10.14 $e^-$ = 5.07 $H_2O$
  81.12 MW + 10.22 MW +    = 91.3 MW
  11.59 lbs.                  1.57 Gal.
  45% PEM FC EFFICIENCY GENERATING OF   9812 WATT HOURS PER ONE GALLON OF
  ETHANOL AND WATER REUTILIZATION OF    1.40 GALLONS.

ALKALINE-ELECTROLYTE FUEL CELL (ALK FC) ANODE: (A)
  5.07 $H_2$ + 10.14 $OH^-$ = 10.14 $H_2O$ + 10.14 $e^-$
  10.22 MW  172.45 MW = 182.7 MW
  1.46 lbs.          3.14 Gal.

ALKALINE-ELECTROLYTE FUEL CELL (ALK FC) CATHODE: (C)
  2.54 $O_2$ + 5.07 $H_2O$ + 10.14 $e^-$ = 10.14 $OH^-$
  81.12 MW + 91.34 MW +    = 172.5 MW
  11.59 lbs. + 1.57 Gal.
  70% ALK FC EFFICIENCY GENERATING OF   15264 WATT HOURS PER ONE GALLON OF
  ETHANOL AND WATER REUTILIZATION OF    1.40 GALLONS.

HYDROCARBON FUELED HYDROGEN FUEL GENERATOR SYSTEM AND APPARATUS IN COMBINATION WITH HYDROGEN FUEL CELLS

BRIEF SUMMARY OF THE INVENTION

This invention relates to a hydrocarbon fueled, hydrogen fuel generator system and apparatus for fuel cells. The primary application for this invention is generating hydrogen fuel for use in fuel cells that convert chemical energy into electricity. The hydrogen fuel generator is fueled by hydrocarbons such as propane, butane, methanol, ethanol, pentane, kerosene, and gasoline. The invention provides a polymer-electrolyte membrane fuel cell anode hydrogen fuel stream that is free of carbon monoxide, carbon dioxide, and sulfur. The invention provides an alkaline-electrolyte fuel cell anode hydrogen fuel that is free of carbon monoxide, carbon dioxide, sulfur, and/or nitrogen. In addition, alkaline-electrolyte oxidizer (air) for the fuel cell cathode is free of carbon dioxide.

PRIOR ART

A hydrogen generating apparatus and a fuel cell is described in U.S. Pat. No. 5,429,886, issued to Ralph C. Struthers on Jul. 4, 1995, and entitled, "HYDROCARBON (HYDROGEN)/AIR AEROGEL CATALYZED CARBON ELECTRODE FUEL CELL SYSTEM". This invention relates to a hydrogen fuel generator that produces carbon monoxide and nitrogen concentrations in the hydrogen fuel. This type of hydrogen generating system is undesirable for polymer-electrolyte membrane fuel cells because of carbon monoxide poisoning.

A hydrogen generating apparatus is described in U.S. Pat. No. 5,942,346, issued to Shabbir Ahmed et al., on Aug. 24, 1999, and entitled, "METHANOL PARTIAL OXIDATION REFORMER". This invention relates to a hydrogen fuel generator that produces carbon monoxide, carbon dioxide, and nitrogen concentrations in the hydrogen fuel. This type of hydrogen generating system is undesirable for polymer-electrolyte membrane fuel cells because of carbon monoxide poisoning and alkaline-electrolyte fuel cells because of carbon dioxide poisoning.

A hydrogen generating apparatus described in U.S. Pat. No. 6,083,425 issued to Clawson et al., on Jul. 4, 2000, and entitled, "METHOD FOR CONVERTING HYDROCARBON FUEL INTO HYDROGEN GAS AND CARBON DIOXIDE". This invention relates to a hydrogen fuel generator that produces carbon monoxide, carbon dioxide, and nitrogen concentrations in the hydrogen fuel. This type of hydrogen generating system is undesirable for polymer-electrolyte membrane fuel cells because of carbon monoxide poisoning and alkaline-electrolyte fuel cells because of carbon dioxide poisoning.

SUMMARY OF THE INVENTION

The present invention is directed the provision of fuel cell powered electric vehicles that are efficient, reduce noise and emissions and unburdened of the problems associated with the use of short range batteries that need to be charged; and, current gasoline-electric hybrid vehicles that need a gasoline combustion engine. Such vehicles will gain about three times the fuel mileage of comparable vehicles with internal combustion engines. The hydrogen fuel generator of this invention is fueled by hydrocarbons such as propane, butane, methanol, ethanol, pentane, kerosene, and gasoline. Accordingly, the existing petroleum fuel infrastructure for producing and distributing fuels is practical and economical for fueling such vehicles.

The advantages of the invention over the prior art are noted below:

1. The present invention provides hydrogen fuel for polymer-electrolyte membrane and alkaline-electrolyte fuel cells that constitute mature forms of the fuel cell technology.
2. The present invention provides an oxidizer (air) stream free of carbon dioxide for alkaline-electrolyte fuel cell cathodes.
3. Fluid-metering pump means move fluids of different physical characteristics in different quantities.
4. An ignition system means and electronic processor control means detonates the hydrocarbon fuel yielding a hot pressurized output gas in a pressure chamber.
5. Hydrocarbon fuel is partially oxidized in a partial oxidizer means yielding a hot pressurized fuel stream of hydrogen and carbon monoxide.
6. Hydrocarbon fuel is completely oxidized in an oxidizer means yielding a hot pressurized fuel stream of steam and carbon dioxide.
7. A steam generating means that generates hot pressurized steam;
8. Heat exchanger means cools the hot pressurized fuel gas stream to a preferred reaction temperature as required for sulfur absorbing, steam reforming and carbon monoxide scavenging.
9. A sulfur absorbing means removes all elemental sulfur compounds in the pressurized fuel stream of hydrogen and carbon monoxide.
10. Steam reformer means reforms carbon monoxide in the fuel stream yielding a pressurized gas stream of hydrogen and carbon dioxide.
11. A carbon monoxide scavenger means converts remaining carbon monoxide to a pressurized gas stream of carbon dioxide.
12. Heat exchanger means cools carbon dioxide gas within carbon dioxide liquid limits.
13. A hydrogen and carbon dioxide separation means separates pressurized hydrogen fuel from pressurized liquid-carbon dioxide.
14. Pressurized steam pumping means pumps atmospheric air into a high-pressure air tank.
15. Carbon dioxide separating means removing carbon dioxide from the air by pressurizing and cooling within carbon dioxide liquid limits.
16. Carbon dioxide and moisture separating means removing carbon dioxide from the air by adsorbent column beds.

It is an object of this invention to provide a sulfur removal means using various porous metal oxide aerogel microspheres of cerium, zinc, strontium, magnesium, copper, lanthanum, barium, iron, yttrium, chromium, cobalt, vanadium, zirconium, and/or suitable precious metals.

It is another object of this invention to provide an improved steam reformer means using a catalyst made from various porous metal aerogel microspheres of nickel, copper, zinc, iron, cobalt, zirconium, chromium, rare earth metals, and/or suitable precious metals.

Yet, another object of this invention is to provide a carbon monoxide scavenger means utilizing various porous metal oxide aerogel microspheres of nickel, manganese, tin, copper, silver, iron, zinc and/or chromium.

Still, another object of this invention is to provide a novel, improved heat exchanger means or system that both heats and cools system components, as required.

Another object of this invention is to provide a propellant of pressurized carbon dioxide liquid for energizing fluid-metering pump means.

Another object of this invention is to provide propellant of pressurized steam for energizing fluid-metering pump means.

It is another object of this invention is to provide a supply of carbon dioxide liquid coolant and a heat exchanger means suitable for secondary use, such as cooling the interior cabin of a related electric vehicle.

Another object of this invention is to provide a hot steam and a heat exchanger means suitable for secondary use, such as heating of the interior cabin of the electric vehicle.

Another object of this invention is to provide electric powered vehicle or the like with our new hydrogen generator system and apparatus as the supply power means that converts hydrocarbon fuel energy to electric energy; an operating strategy for a fuel cell electric powered vehicle that manages the flow of energy to maximize fuel economy; an inverter that converts the direct current output from the fuel cells, and energy stored in a battery pack to a three-phase alternating current. A motor/generator receives the alternating current and produces a rotating driving force that is transmitted through a continuously variable or automatic transmission to vehicular wheels. A controller is connected to the motor/generator, accelerator pedal and brake pedal. When the vehicle is coasting or the brakes are applied, the wheels drive the motor/generator, converting the vehicle's kinetic energy to electricity that charges the battery pack.

Finally, it is object of this invention is to recycle atmospheric carbon dioxide to methanol fuel. The earth's ozone layer is being depleted and it could be reversed if recycled carbon dioxide methanol fuel was used to operate automobiles and/or the like. The reduction of carbon dioxide to methanol is represented by the chemical equation of

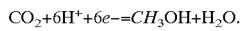

$$CO_2 + 6H^+ + 6e^- = CH_3OH + H_2O.$$

The above objects and features of this invention will be understood from the following detailed description of the invention, wherein reference is made to the accompanying drawings.

DESCRIPTION OF THE DRAWINGS

FIG. 7 is a theoretical computation of chemical formula, polymer-electrolyte membrane and circulating alkaline-electrolyte fuel cell efficiencies of the hydrogen gas generator when propane fueled and air-oxidized;

FIG. 8 is a theoretical computation of chemical formula, polymer-electrolyte membrane and matrix alkaline-electrolyte fuel cell efficiencies of the hydrogen gas generator when propane fueled and hydrogen peroxide-oxidized;

FIG. 9 is a theoretical computation of chemical formula, polymer-electrolyte membrane and circulating alkaline-electrolyte fuel cell efficiencies of the hydrogen gas generator when methanol fueled and air-oxidized;

FIG. 10 is a theoretical computation of chemical formula, polymer-electrolyte membrane matrix alkaline-electrolyte fuel cell efficiency of the hydrogen gas generator when methanol fueled and hydrogen peroxide-oxidized;

FIG. 11 is a theoretical computation of chemical formula, polymer-electrolyte membrane and circulating alkaline-electrolyte fuel cell efficiencies of the hydrogen gas generator when gasoline fueled and air-oxidized;

FIG. 12 is a theoretical computation of chemical formula, polymer-electrolyte membrane matrix-alkaline-electrolyte fuel cell efficiencies of the hydrogen gas generator when gasoline fueled and hydrogen peroxide-oxidized;

FIG. 13 is a theoretical computation of chemical formula, polymer-electrolyte membrane and circulating alkaline-electrolyte fuel cell efficiencies of the hydrogen gas generator when kerosene fueled and air-oxidized;

FIG. 14 is a theoretical computation of chemical formula, polymer-electrolyte membrane and matrix alkaline-electrolyte fuel cell efficiencies of the hydrogen gas generator when kerosene fueled and hydrogen peroxide-oxidized;

FIG. 15 is a theoretical computation of chemical formula, polymer-electrolyte membrane and circulating alkaline-electrolyte fuel cell efficiencies of the hydrogen gas generator when ethanol fueled and air-oxidized; and FIG. 16 is a theoretical computation of chemical formula, polymer-electrolyte membrane and matrix alkaline-electrolyte fuel cell efficiencies of the hydrogen gas generator when ethanol fueled and hydrogen peroxide-oxidized.

DETAILED DESCRIPTION OF THE INVENTION

The system and apparatus of the present invention operates to provide a hydrogen fuel stream that is free of carbon monoxide, carbon dioxide, sulfur, and nitrogen. The invention is particularly suitable to providing a hydrogen fuel stream for use in fuel cell systems as might be used in electric powered vehicles and other devices and means commonly powered with internal combustion engines.

Figure 1:
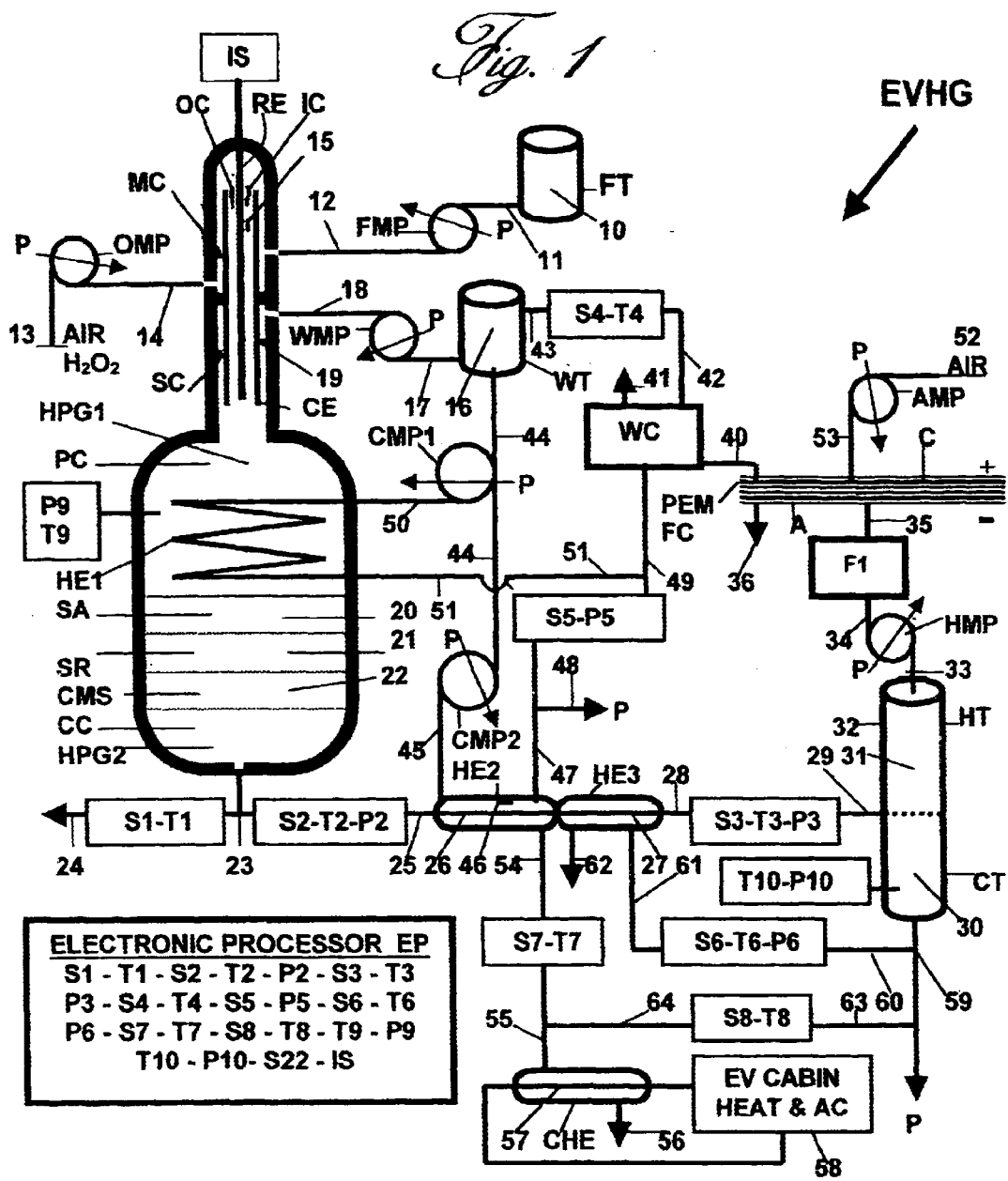
FIG. 1 is a schematic illustration of our new hydrogen fuel generator system and apparatus in which a polymer-electrolyte membrane fuel cell is utilized.
Figure 2:
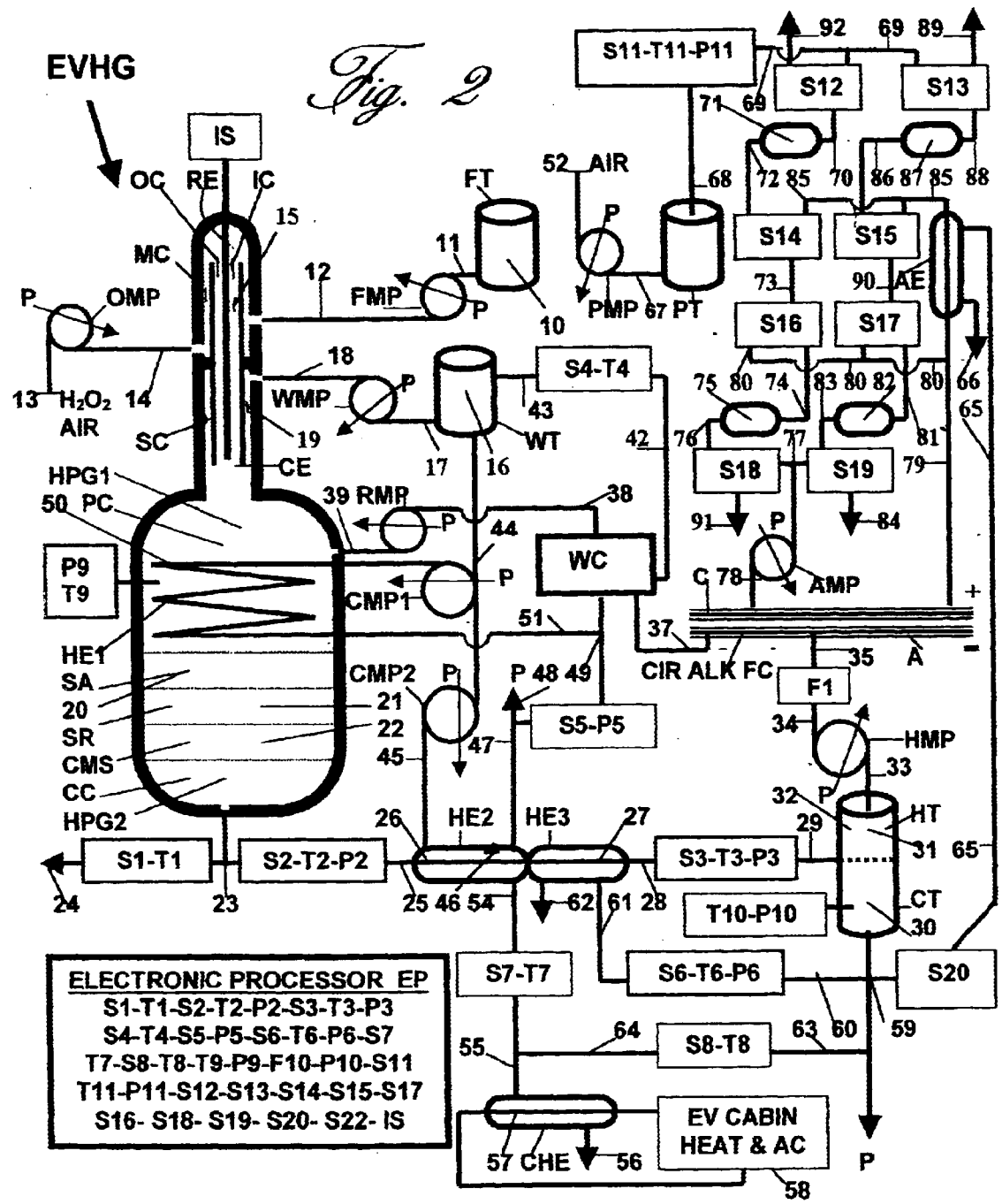
FIG. 2 is a schematic illustration of our new hydrogen fuel generator system and apparatus in which a circulating alkaline-electrolyte fuel cell is utilized.
Figure 3:
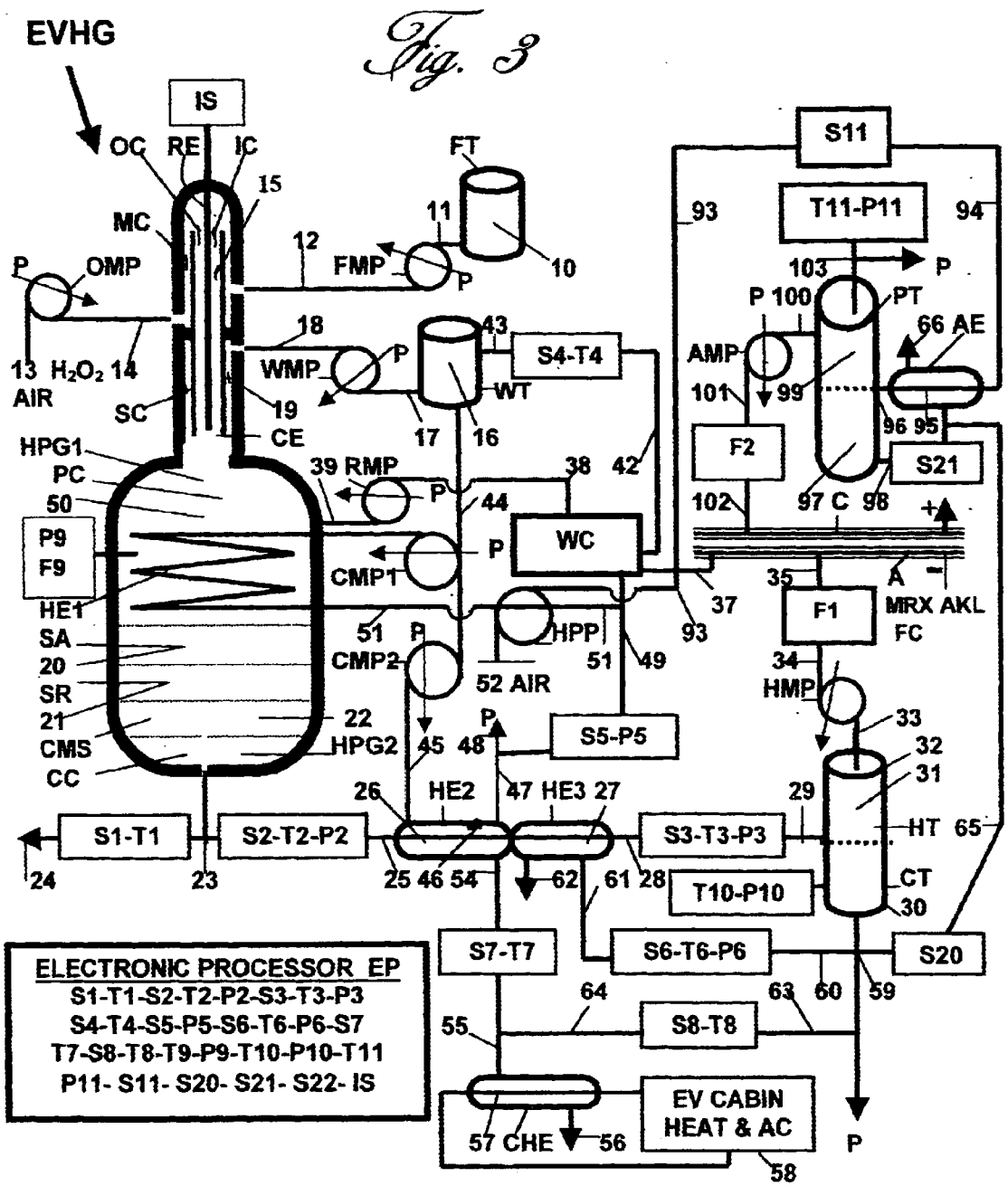
FIG. 3 is a schematic illustration of our new hydrogen fuel generator system and apparatus in which a matrix alkaline-electrolyte fuel cell is utilized.

Referring to FIG. 1, FIG. 2 and FIG. 3 of the drawings the hydrogen fuel generator system and apparatus EVHG and the fuel cell FC can, for example be advantageously mounted aboard an electric powered vehicle (not shown or described).

The hydrogen fuel generator system and apparatus EVHG generates hydrogen fuel for use in fuel cells that convert chemical energy into electricity. The hydrogen fuel generator can be fueled by hydrocarbons of propane, butane, methanol, ethanol, pentane, kerosene, or gasoline. A propellant P powered fuel-metering pump FMP receives hydrocarbon fuel 10 from a line extending from a fuel tank FT and delivers the fuel through a line 12 into a mixing and vaporizing chamber MC at the upstream end of a tank-like structure. In addition, a propellant P powered oxidizer-metering pump OMP delivers air or hydrogen peroxide oxidizer 13 through a line 14 into the mixing and vaporizing chamber MC.

The oxidizer and fuel within the mixing and vaporizing chamber MC are mixed, vaporized and flow from chamber MC into an throughout an ignition chamber IC within the tank-like structure. An ignition means IS within chamber IC detonates the oxidizer and fuel vapor 15, thereby oxidizing said fuel mixture.

The oxidizer chamber OC of the tank-like structure includes an elongate cylindrical exterior part, an inner tubular part, tubular CE and an elongate rod electrode RE positioned centrally within the part CE. The electrode is suitable electrically energized to generate a high voltage arcs within the chamber IC. The product of oxidation in chamber OC advances or flows into an intake or receiving zone of a pressure chamber Pc down stream thereof.

A propellant P powered water-metering pump WMP moves water 16 from a tank WT through lines 17 and 18 into a steam chamber SC, generating steam 19. The steam chamber SC is shown as an annular chamber about the part CE and receives water from line 18. The steam generated in chamber SC advances or flows downstream into the pressure chamber PC.

In a startup mode, the hot pressurized gas HPGL in the pressure chamber PC contains carbon dioxide, steam, and sulfur.

In the operational mode, the hot pressurized gas HPG1 in the pressure chamber PC contains hydrogen, carbon monoxide, and steam (it might also contain sulfur and/or nitrogen if that gas is present).

The hot pressurized gas stream HPG1 flows about and is tempered or cooled by a first heat exchanger HB1 to the preferred zone reaction temperature as required for sulfur absorbing, steam reforming, and carbon monoxide scavenging.

A pack or bed of sulfur absorbent material SA is suitably positioned at zone 20 within the tank-like structure and works to remove all elemental sulfur compounds from the tempered pressurized gas stream HPG1. The zone 20 is immediately downstream of the receiving zone in the chamber PC and receives the gas HPG1 first generated in the chamber PC.

The sulfur free pressurized gases HPG1 next advances and flows downstream from pack or bed 20 into and throughout a catalyst pack or bed 21 of a steam reformer means SR in the a zone 21 in chamber PC of the tank-like structure that is immediately downstream of the zone 20. The steam reformer SR reforms the carbon monoxide to hydrogen fuel and carbon dioxide, producing a pressurized gas output stream HPG2.

A carbon monoxide scavenger means CMS, including a pack or bed 22 is positioned within the tank-like structure at immediate downstream of the steam reformer means SR and works to convert residual carbon monoxide to carbon dioxide in the pressurized output gas HPG2 that advance into a gas-collecting zone CC in the tank-like structure immediately downstream from of 22.

If air is the oxidizer 13 in the operational mode, the pressurized gas output stream HPG2 will contain nitrogen, hydrogen, and carbon dioxide. If hydrogen peroxide is the oxidizer 13 in the operational mode, the pressurized gas output stream HPG2 will be nitrogen free and will only contain hydrogen and carbon dioxide.

In a startup mode, the controlled temperature of the pressurized gas output stream HPG2 is less than 650° F. It flows through a solenoid-actuated valve S1 from a line 23 to the atmosphere 24-control means for the valve S1 induces a thermocouple T1 between lines 23–24 the thermocouple must test gas temperature at less than about 650° F. to effect opening of that value.

In a pressure mode, between about 734 psi to about 1052 psi, and at a temperature from about 650° F. to a preferred reaction temperature as required for sulfur absorbing, steam reforming, and carbon monoxide scavenging the pressurized gas output stream HPG2 flows through heat exchangers HE2 and HE3. The pressurized gas output stream HPG2 flows through line 23. A solenoid actuated valve S2 connects with an outlet of line 23. Lines 25, 26, and 27 extend from valve S2 to and through the heat exchangers HE2 and HE3. A pressure sensor P2 at valve S2 and a pressure sensor P9 at chamber PC must test between about 734 psi to about 1052 psi. Thermocouple T9 at the pressure chamber PC must test between about 650° F. to the preferred hydrocarbon fuel combustion exothermic reaction temperature. Thermocouple T2 at the collecting zone CC must test between about 650° F. to the preferred zone reaction temperature as required for sulfur absorbing, steam reforming, and carbon monoxide scavenging.

In a cooling mode, when pressures are from between about 734 psi to about 1052 psi and when temperatures are from about 59° F. to about 87° F., at line 28, valve S2 operates to allow the pressurized gas output stream HPG2 to flow through the heat exchangers HE2 and HE3 to an elongate vertical hydrogen and carbon dioxide separator tank 32. The cooled pressurized gas output stream HPG2 in the tank 32 is separates to hydrogen fuel HT and carbon dioxide liquid CT. Thermocouples T3 between lines 28–29 and T10 related to the lower end of tank 32 must both test between about 59° F. to about 87° F. and a pair of vertically spaced pressure sensors P3 and P10 related to the lower liquid carbon dioxide collecting portion of the tank 32 must both test between about 734 psi to about 1052 psi.

Figure 6:
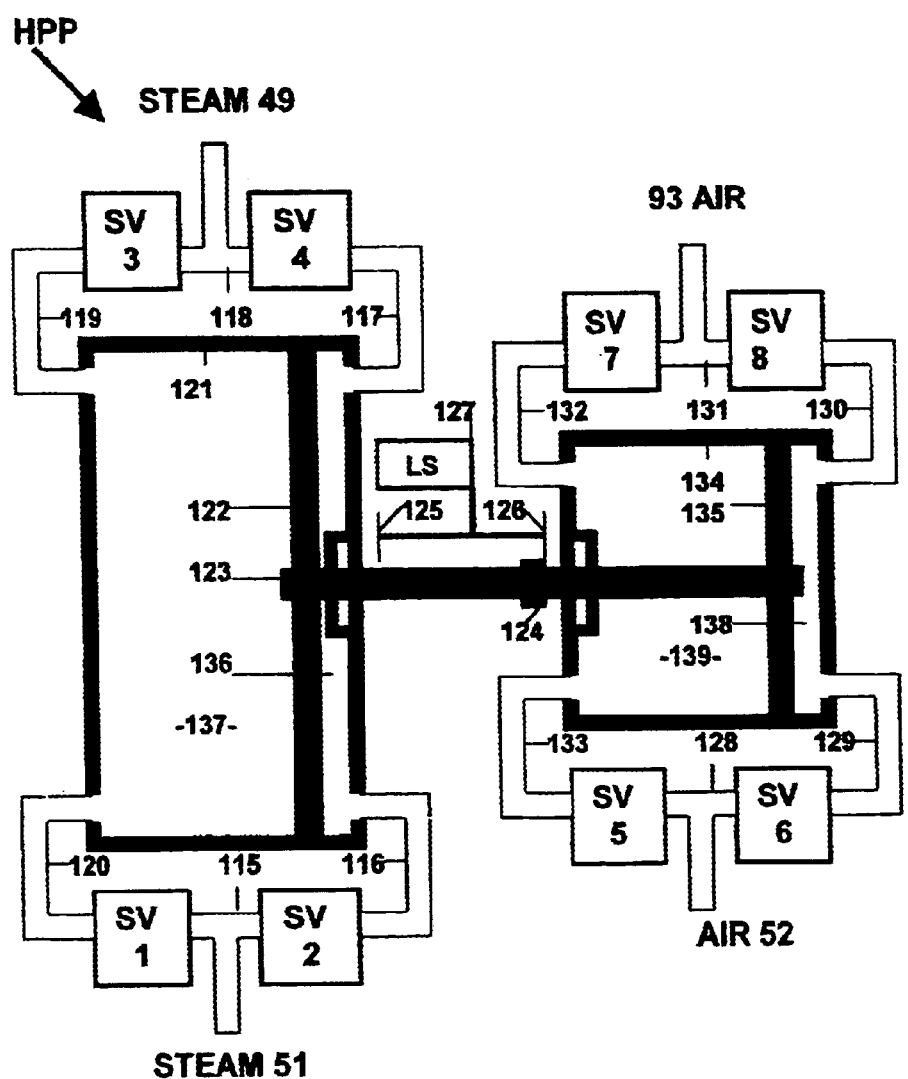
FIG. 6 is a sectional view of a form of a direct acting reciprocating, steam-driven high-pressure air pump suitable for use in carrying out the invention.

Referring to FIG. 3 and FIG. 6, the steam outflows from exchanger HE1 is used as a propellant P. The steam propellant P flows by way of line 51 to power a high-pressure air pump HPP and returns used steam flows through lines 51' and 49 to the water condenser WC.

A propellant P powered coolant-metering pump CMP2 moves water coolant 16 through lines 44 and 45 throughout the second heat exchanger HE2 cooling the hydrogen fuel gas and carbon dioxide gas HPG2 in line 26 within the exchanger HE2, and generates steam 46 in line 47. The pressurized carbon dioxide 30 stored in liquid state is collected in tank 32 that flows though lines 59 and 60 to and through solenoid actuated valve S6 and line 61. The liquid carbon dioxide expands, cooling and absorbing heat from the surface of line 27 and is vaporized by sublimation through the third heat exchanger HE3; and, exits the system through line 62. Heat exchanger HE3 cooled carbon dioxide gas in line 27 yields carbon dioxide liquid 30 in line 28 at the downstream end of the exchanger. The liquid-phase range limits of temperature and pressure for carbon dioxide are about 59° F. to about 87° F. and about 734 psi to about 1052 psi. The carbon dioxide liquid 30 flows by way of line 29 into carbon dioxide liquid pressure tank CT and the hydrogen fuel 31 flows by way of line 29 into hydrogen pressure tank HT. The separated vapor and liquid are stored, under pressure as hydrogen fuel 31 at the top and as carbon dioxide liquid 30 at the bottom of the separator pressure tank 32.

A propellant P powered hydrogen-metering pump HMP moves the hydrogen fuel 31 from the pressure tank 32 through lines 33 and 34 into and throughout a column bed F1 absorbing any residual carbon dioxide, carbon monoxide and/or elemental sulfur compounds from the hydrogen fuel before flowing through line 35 to and throughout a fuel cell FC anode electrodes A. The unused hydrogen 31, steam, (and nitrogen) flow through line 36 or line 37.

Polymer-electrolyte membrane PEM type fuel cells FC, as shown in FIG. 1. A propellant P powered air-metering pump AMP move air 52 from the atmosphere by way of line 53 throughout the fuel cell FC cathode electrodes C. The unused oxidizer, steam, and nitrogen flow through line 40.

Circulating alkaline-electrolyte CIR ALK type fuel cell FC as shown in FIG. 2. The propellant P powered pressure-metering pump PMP compresses air 52 from the atmosphere by way of line 67 into a pressurized air supply tank PT. The air supply tank PT pressure range of the air is maintained between about 30 psi to about 100 psi by means of a sensor on P11, and temperature range is maintained between about 60° F. to about 120° F. by means of a thermocouple T11.

In the following column beds 71 and 75 will be initially described in the adsorption mode and column beds 82 and 87 will be initially described in the regeneration mode. During the first phase of the process, airflows through three-way solenoid actuated valve S12 from line 69 to line 70 and column bed 71. Airflows through three-way solenoid actuated valve S14 from line 72 to line 73. Air also flows through three-way solenoid actuated valve S16 from line 73 to line 74 and column bed 75. Air also flows through three-way solenoid actuated valve S18 from line 76 to line 77. Air flows through propellant P powered air-metering pump AMP that moves or delivers air free of carbon dioxide from line 77 through line 78 to and throughout the fuel cell CIR ALK FC cathode electrodes C.

Meanwhile, hot regeneration purge gas from line 79 of the fuel cell CIR ALK FC cathode electrodes C output exhaust flows through three-way solenoid actuated valve S17 from line 80 to line 81 and column bed 82, purge gas flows through three-way solenoid actuated valve S19 from line 83, the regeneration gas, and desorbed carbon dioxide exits the system through line 84.

The remainder of the hot regeneration purge gas from line 79 of the fuel cell CIR ALK FC cathode electrodes C output exhaust flows throughout heat exchanger AE, purge gas flows through three-way solenoid actuated valve S15 from line 85 to line 86 and column bed 87, purge gas flows through three-way solenoid actuated valve S13 from line 88 with the regeneration purge gas, desorbed carbon dioxide, and moisture exits the system through line 89. The pressurized carbon dioxide 30 stored in liquid state is collected in tank 32 that flows though line 59 to and through solenoid actuated valve S20 and line 65 expanding, cooling and absorbing heat from the surface of line 85 and is vaporized by sublimation through the heat exchanger AE and exits the system through line 66. The thermocouple T10 must test between about 59° F. to about 87° F., and pressure sensor P10 must test between about 734 psi to about 1052 psi.

During the second phase of the process, air flows through three-way solenoid actuated valve S13 from line 69 to line 88 and column bed 87, air flows through three-way solenoid actuated valve S15 from line 86 to line 90, air flows through three-way solenoid actuated valve S17 from line 90 to line 81 and column bed 82, air flows through three-way solenoid actuated valve S19 from line 83 to line 77, air flows through propellant P powered air-metering pump AMP that moves air free of carbon dioxide from line 77 to line 78 throughout the fuel cell CIR ALK FC cathodes C.

Meanwhile, hot regeneration purge gas from line 79 of the fuel cell CIR ALK FC cathodes C output exhaust flows through three-way solenoid actuated valve S16 from line 80 to line 74 and column bed 75, purge gas flows through three-way solenoid actuated valve S18 from line 76, the regeneration gas, and desorbed carbon dioxide exits the system through line 91.

The remainder of the hot regeneration purge gas from lines 79 of the fuel cell CIR ALK FC cathodes C output exhaust flows through heat exchanger AE, purge gas flows through three-way solenoid actuated valve S14 from line 85 to line 72 and column bed 71, purge gas flows through three-way solenoid actuated valve S12 from line 70 with the regeneration purge gas, desorbed carbon dioxide, and moisture exits the system through line 92. The pressurized carbon dioxide 30 stored in liquid state is collected in tank 32 that flows though line 59 to and through solenoid actuated valve S20 and line 65 expanding, cooling and absorbing heat from the surface of line 85 and is vaporized by sublimation through the heat exchanger AE and exits the system through line 66. The thermocouple T10 must test between about 59° F. to about 87° F., and pressure sensor P10 must test between about 734 psi to about 1052 psi.

In the case of matrices alkaline-electrolyte MRX ALK type fuel cell FC as shown in FIG. 3. The steam propellant P in line 51 powers a high-pressure pump HPP as shown in FIG. 6 compressing atmospheric air in line 52 through line 93 and pressure solenoid actuated valve S11, by way of line 94 through line 95 within the heat exchanger AE by way of line 96 to a high-pressure air pressure tank PT. In a pressure mode, when pressures are from between about 734 psi to about 1052 psi and when temperatures are from about 59° F. to about 87° F. the air is directed to flow through the cooled heat exchanger AE to an air and carbon dioxide separator tank PT. The cooled pressurized air output stream in the tank PT is separated to air 99 and carbon dioxide liquid 97. Thermocouple T11 related to tank PT must test between about 59° F. to about 87° F. and pressure sensor P11 must test between about 734 psi to about 1052 psi. The pressurized carbon dioxide 30 stored in liquid state is collected in tank 32 that flows though line 60 to and through solenoid actuated valve S20 and line 65 expanding, cooling and absorbing heat from the surface of line 95 and is vaporized by sublimation through the heat exchanger AE and exits the system through line 66. In addition, the carbon dioxide liquid coolant 97 collected in tank PT flows though line 98 to and through solenoid actuated valve S21, line 65 into and cooling the heat exchanger AE, and exits the system through line 66. Heat exchanger AE cooled carbon dioxide gas in line 95 yields carbon dioxide liquid 97 at the downstream end of the exchanger. The liquid-phase range limits of temperature and pressure for carbon dioxide are about 59° F. to about 87° F. and about 734 psi to about 1052 psi. A propellant P powered air-metering pump AMP moves the air 99 from the pressure tank PT by way of lines 100 and 101 throughout column bed F2 for absorbing residual carbon dioxide and flows from line 102 throughout the fuel cell MRX AKL FC cathode electrodes C.

Controlled water usage management supply 16 by electronic processor EP shown in FIG. 1. The polymer-electrolyte membrane PEM fuel cell FC cathode electrode C moves hot output exhaust gas of unused oxidant, nitrogen, and water vapor 16 by way of line 40 throughout a water condenser WC. Nitrogen and unused oxidant flows through line 41 to atmosphere.

Controlled water usage management supply 16 by electronic processor EP shown in FIG. 2 and FIG. 3. The alkaline-electrolyte ALK fuel cell FC anode electrode A moves hot output exhaust gas of unused hydrogen 31 and water vapor 16 by way of line 37 throughout a water condenser WC. The return-metering pump RMP ejects said unused hydrogen 31 back to the EVHG system from line 38 of the water condenser WC by way of line 39 throughout the pressure chamber PC. The water 16 flows from the water condenser WC by way of lines 42, 43, and solenoid actuated valve S4 to the water storage tank WT. The thermocouple T4 must test less than about 212° F.

A propellant P powered coolant-metering pump CMP1 moves water coolant 16 through lines 44 and 50 for cooling gas fluids HPG1 surrounded by the first heat exchanger HE1, and generates a steam propellant P within line 51. The steam propellant P flows by way of line 51 to power the high-pressure air pump HPP as shown FIG. 3 and FIG. 6, and returns used steam to the water condenser WC. A propellant P powered coolant-metering pump CMP2 ejects water coolant 16 through lines 44 and 45 for cooling line 26 gas fluids within the second heat exchanger HE2, and generates a steam 46 propellants P in line 47. The steam 46 propellants P flows by way of line 48 to power the fluid-metering pumps MP, FMP, OMP, WMP, RMP, CMP, PMP, HMP, and AMP. Regulated steam 46 propellants P also flows by way of line 47 and solenoid actuated valve S5 and returns used steam by line 49 to water condenser WC. The pressure sensor P5 must test between about 25 psi to about 50 psi.

The carbon dioxide liquid 30 propellant P flows by way of line 59 to power the fluid-metering pumps MP, FMP, OMP, WMP, RMP, CMP, PMP, HMP, and AMP. The thermocouple T10 must test between about 59° F. to about 87° F, and pressure sensor P10 must test between about 734 psi to about 1052 psi.

In addition, the pressurized carbon dioxide 30 stored in liquid state is collected in tank 32 that flows though lines 59 and 60 to and through solenoid actuated valve S6 and line 61 expanding, cooling and absorbing heat from the surface of line 27 and is vaporized by sublimation through the third heat exchanger HE3 and exits the system through line 62. The thermocouples T6 and T10 must both test between about 59° F. to about 87° F., and pressure sensors P6 and P10 must both test between about 734 psi to about 1052 psi. The carbon dioxide gas in line 27 is cooled to a carbon dioxide liquid 30 in line 28.

Electronic Processor EP regulates fluid-metering pumps MP, power propellant P, ignition system IS, heat exchangers HE1, HE2 and HE3, heat exchanger AE, cabin heat exchanger CHE, fuel cell system FC, water condenser WC, solenoid actuated valves S1–S22, thermocouples T1–T11, and pressure sensors P1–P11.

The sulfur absorbent SA absorbent materials in zone 20 for the removal of elemental sulfur compounds from the hydrocarbon fuel 10 are made from various porous mixed metal oxide aerogel microspheres of cerium, zinc, strontium, magnesium, copper, lanthanum, barium, iron, yttrium, chromium, cobalt, vanadium, zirconium and precious metals.

The steam reformer SR catalyst in zone 21 is made from mixed metal aerogel microspheres of nickel, copper, zinc, iron, cobalt, zirconium, chromium, rare earth metal, and precious metals.

The metal oxide materials in zone 22 of the carbon monoxide scavenger CMS are made from porous aerogel microspheres of mixed metal $M_n$ oxides $O_n$ of nickel, manganese, tin, copper, silver, iron, zinc and chromium. The carbon monoxide scavenger CMS operates to remove carbon monoxide, in the following chemical formula proportions and reactions.

$$MO_2+2CO \rightarrow M+2CO_2, \ MO+CO \rightarrow M+CO_2 \text{ and } M_2O+CO \rightarrow 2M+CO_2.$$

In an operational startup mode, propane fuel 10 and an air oxidizer 13 completely oxidizes said fuel in the oxidizer chamber OC. The exothermic chemical reaction of $$C_3H_8+4H_2+7O_2+11.28N_2 \rightarrow 3CO_2+8H_2O+11.28N_2 \Delta H_{298}=-2220 \text{ kJ}$$

that heats the EVHG system to an operational temperature in a few seconds. The thermocouples T1 and T9 must both test less than about 650° F.

In an operational mode, propane fuel 10 and a 60% hydrogen peroxide oxidizer 13 partially oxidizes said fuel in the partial oxidizer chamber PO. The exothermic chemical reaction of $$C_3H_8+1.68H_2O_2+1.12H_2O \rightarrow 0.36CO_2+2.64CO+1.12H_2O+5.68H_2 \Delta H_{298}=-13.424 \text{ kJ}$$

heats the EVHG system to a sustained operational temperature. The pressure sensors P2 and P9 must both test between about 734 psi to about 1052 psi. Thermocouple T9 at the pressure chamber PC must test between about 650° F. to the preferred hydrocarbon fuel combustion exothermic reaction temperature. Thermocouple T2 at the collecting chamber CC must test between about 650° F. to the preferred zone reaction temperature as required for sulfur absorbing, steam reforming, and carbon monoxide scavenging. The exothermic temperature of the oxidizer chamber is controlled by regulating the oxidizer to hydrocarbon fuel ratio.

In the operational mode, carbon monoxide is steam reformed to a pressurized gas stream yielding hydrogen fuel and carbon dioxide. The endothermic chemical reaction of $$0.36CO_2+2.64CO+2.66H_2O+5.68H_2 \rightarrow 3CO_2+0.02H_2O+8.32H_2 \Delta H_{298}=13.258 \text{ kJ}$$

that controls the heat of the EVHG system to a sustained operational temperature by varying the water 16 input from water-metering pump WMP. Thermocouple T9 at the pressure chamber PC must test between about 650° F. to the preferred hydrocarbon fuel combustion exothermic reaction temperature. Thermocouple T2 at the collecting chamber CC must test between about 650° F. to the preferred zone reaction temperature as required for sulfur absorbing, steam reforming, and carbon monoxide scavenging. Regulating the water input from water-metering pump CMP1 controls the steam reformer chemical reaction and endothermic temperature of the pressurized gas stream.

The steam 46 from heat exchanger HE2 flows by way of line 54, solenoid actuated valve S7, and line 55 throughout a cabin heat exchanger CHE to atmosphere 56. The cabin heat exchanger CHE heats the electric vehicle cabin 58 as per thermocouple T7.

The carbon dioxide liquid 30 flows by way of lines 59 and 63, solenoid actuated valve S8 and lines 64 and 55 throughout the cabin heat exchanger CHE to atmosphere 56. The cabin heat exchanger CHE cools the electric vehicle cabin 58 as per thermocouple T8.

Figure 4:
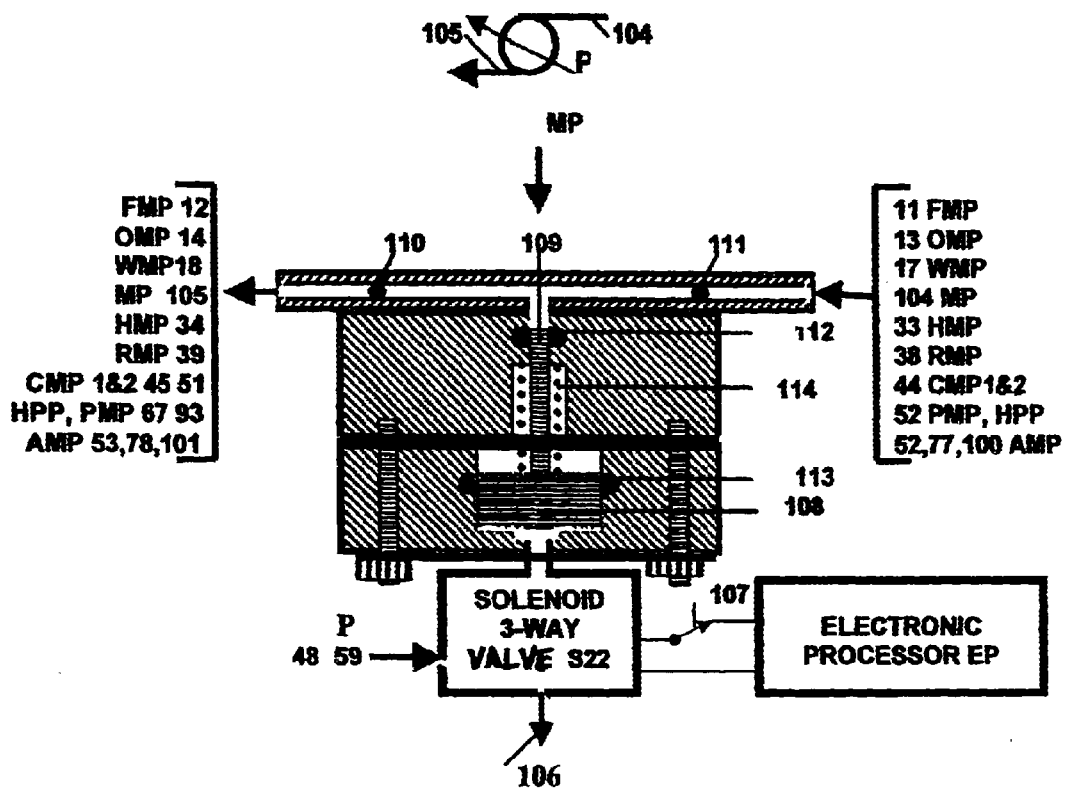
FIG. 4 is a sectional view of a form of fluid-metering pump suitable for use in carrying out the invention.

Referring to FIG. 4 of the drawings, the fluid-metering pumps MP (e.g., FMP, OMP, WMP, RMP, CMP, PMP, HMP, HPP, and AMP) in conjunction with FIG. 1, FIG. 2 and FIG. 3. A pressurized carbon dioxide liquid 30 contained in the pressure tank CT is the propellant P in line 59 for powering the high-pressure fluid-metering pumps FMP, OMP, HPP, WMP, and RMP. The pressurized steam 46 propellants P from the heat exchanger HE2 is also a propellant P in line 48 for powering the low-pressure fluid-metering pumps CMP, PMP, HMP, and AMP. Electronic Processor EP regulates fluid-metering pump MP flow by energizing switch 107 of a three-way solenoid actuated valve S22. A large piston 108 compresses a small piston 109 which fluid amplifies the pneumatic pressure. The pneumatic pressure performs a pumping action comprising check ball valves 110 and 111. O-ring 112 seals the small piston. O-ring 113 seals the large piston. Return spring 114 returns the pistons to their power-stoke position, and the fluid ejects from the right end 104 to the left end 105.

Figure 5:
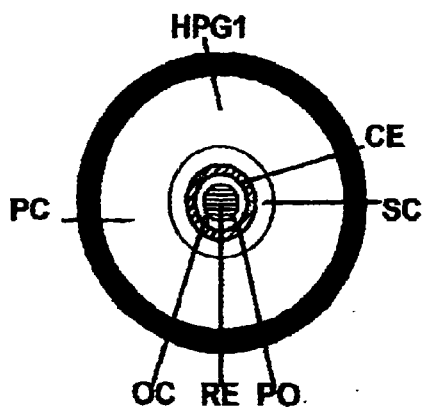
FIG. 5 is a cross sectional view of chambers and electrodes shown in FIG. 1, FIG. 2 and FIG. 3.

Referring to FIG. 5 of the drawings is a view taken substantially as indicated by FIG. 1, FIG. 2 and FIG. 3.

Referring to FIG. 6 of the drawings, We have set forth a direct acting reciprocating steam high-pressure air pump HPP. Each stroke of the rod 123 connecting pistons 122 and 135 fills or empties chambers 136 and 138 and empties or fills chambers 137 and 139, which nearly doubles the flow rate (less the volume of the piston rod 123) over a single-acting force pump, it also smoothes the flow. The pressurized steam 51 propellant P enters the system through line 115 where the steam valves SV 1 and SV 2, switch back and forth between lines 116 or 120 for intake and exhaust strokes. The air 52 from the atmosphere enters the system through line 128 where the air valves SV 5 and SV 6, switch back and forth between lines 129 or 133 for intake and exhaust strokes. The compressed air exits the system through lines 130 or 132 where the air valves SV 7 and SV 8 switch back and forth between lines 130 and 132.

When the piston rod 123 of pistons 122 and 135 in cylinders 121 and 134 reaches the extreme right limit of its stroke, and rod collar 124 contacts limit 126 of limit switch LS-127 and the following events occur in the following sequence:

The pressurized steam propellant 51 from the heat exchanger HE1 in line 115 for powering the direct acting reciprocating steam high-pressure air pump HPP (a) Steam valves SV 2 and SV 3 opens, SV 1 and SV 4 closes
(b) Air valves SV 6 and SV 7 opens, SV 5 and SV 8 closes
(c) Pistons 122 and 135 starts to extend left
(d) Air is compressed in lines 131 and 132

When the piston rod 123 of pistons 122 and 135 in cylinders 121 and 134 reaches the extreme left limit of its stroke, and rod collar 124 contacts limit 125 of limit switch LS-127 and the following events occur in the following sequence:

(e) Steam valves SV 1 and SV 4 opens, SV 2 and SV 3 closes
(f) Air valves SV 5 and SV 8 opens, SV 6 and SV 7 closes
(g) Pistons 122 and 135 starts to extend right
(h) Air is compressed in lines 130 and 131.

Referring to FIGS. 7–16 of the drawings. We have set forth-theoretical weights or amounts of products, and reactants used in carrying out the invention from one gallon of hydrocarbon fuels of propane, methanol, gasoline, kerosene, and ethanol. Next, attention is directed to the operation of the hydrogen gas generator. we start with one gallon of hydrocarbon fuel as a base line and air from the atmosphere are fed into the partial oxidizer chamber; and water is fed into the steam reformer and its products of reaction pressurized fuel gas stream of carbon dioxide ($CO_2$) and hydrogen ($H_2$). The carbon monoxide scavenger converts any remaining carbon monoxide to a pressurized gas stream of carbon dioxide. The heat exchanger cools hydrogen and carbon dioxide gas within carbon dioxide liquid limits. The hydrogen and carbon dioxide separation separates pressurized hydrogen fuel from pressurized liquid-carbon dioxide.

Referring to FIG. 7 of the drawings, is a theoretical computation of chemical formula of polymer-electrolyte membrane and circulating alkaline-electrolyte fuel cell efficiencies of the hydrogen gas generator when methanol fueled and air-oxidized. The theoretical weights or amounts of products and reactants used in carrying out the invention starts with one gallon of propane ($C_3H_8$) as a base line and 19.52 pounds of air from the atmosphere. The fuel and air are fed into the partial oxidizer chamber, and 0.77 gallons of water ($H_2O$) is fed into the steam reformer and its products of reaction are a pressurized fuel gas stream of 12.51 pounds of carbon dioxide ($CO_2$) and 1.34 pounds of hydrogen ($H_2$). The polymer-electrolyte membrane fuel cell at 45 percent efficiency generates 8,980-watt hours per one gallon of propane fuel. The circulating alkaline-electrolyte fuel cell at 70 percent efficiency generates 13,969-watt hours per one gallon of propane fuel.

Referring to FIG. 8 of the drawings, is a theoretical computation of chemical formula of polymer-electrolyte membrane and matrix alkaline-electrolyte fuel cell efficiencies of the hydrogen gas generator when methanol fueled and air-oxidized. The theoretical weights or amounts of products and reactants used in carrying out the invention starts with one gallon of propane ($C_3H_8$) as a base line and 7.32 pounds of 60 percent hydrogen peroxide. The fuel and hydrogen peroxide are fed into the partial oxidizer chamber, and 0.55 gallons of water ($H_2O$) is fed into the steam reformer and its products of reaction are a pressurized fuel gas stream of 12.51 pounds of carbon dioxide ($CO_2$) and 1.59 pounds of hydrogen ($H_2$). The polymer-electrolyte membrane fuel cell at 45 percent efficiency generates 10,676-watt hours per one gallon of propane fuel. The circulating alkaline-electrolyte fuel cell at 70 percent efficiency generates 16,607-watt hours per one gallon of propane fuel.

Referring to FIG. 9 of the drawings, is a theoretical computation of chemical formula of polymer-electrolyte membrane and circulating alkaline-electrolyte fuel cell efficiencies of the hydrogen gas generator when methanol fueled and air-oxidized. The theoretical weights or amounts of products and reactants used in carrying out the invention starts with one gallon of methanol ($CH_3OH$) as a base line and 7.08 pounds of air from the atmosphere. The fuel and air are fed into the partial oxidizer chamber, and 0.24 gallons of water ($H_2O$) is fed into the steam reformer and its products of reaction are a pressurized fuel gas stream of 9.08 pounds of carbon dioxide ($CO_2$) and 1.04 pounds of hydrogen ($H_2$). The polymer-electrolyte membrane fuel cell at 45 percent efficiency generates 6984-watt hours per one gallon of propane fuel. The circulating alkaline-electrolyte fuel cell at 70 percent efficiency generates 10,863-watt hours per one gallon of propane fuel.

Referring to FIG. 10 of the drawings, is a theoretical computation of chemical formula of polymer-electrolyte membrane and matrix alkaline-electrolyte fuel cell efficiencies of the hydrogen gas generator when methanol fueled and air-oxidized. The theoretical weights or amounts of products and reactants used in carrying out the invention starts with one gallon of methanol ($CH_3OH$) as a base line and 3.56 pounds of 60 percent hydrogen peroxide. The fuel and hydrogen peroxide are fed into the partial oxidizer chamber, and 0.13 gallons of water ($H_2O$) is fed into the steam reformer and its products of reaction are a pressurized fuel gas stream of 9.08 pounds of carbon dioxide ($CO_2$) and 1.09 pounds of hydrogen ($H_2$). The polymer-electrolyte membrane fuel cell at 45 percent efficiency generates 7,333-watt hours per one gallon of propane fuel. The circulating alkaline-electrolyte fuel cell at 70 percent efficiency generates 11,407-watt hours per one gallon of propane fuel.

Referring to FIG. 11 of the drawings, is a theoretical computation of chemical formula of polymer-electrolyte membrane and circulating alkaline-electrolyte fuel cell efficiencies of the hydrogen gas generator when methanol fueled and air-oxidized. The theoretical weights or amounts of products and reactants used in carrying out the invention starts with one gallon of gasoline ($C_8H_{18}$) as a base line and 28.19 pounds of air from the atmosphere. The fuel and air are fed into the partial oxidizer chamber, and 1.12 gallons of water ($H_2O$) is fed into the steam reformer and its products of reaction are a pressurized fuel gas stream of 18.07 pounds of carbon dioxide ($CO_2$) and 1.74 pounds of hydrogen ($H_2$). The polymer-electrolyte membrane fuel cell at 45 percent efficiency generates 11,815-watt hours per one gallon of propane fuel. The circulating alkaline-electrolyte fuel cell at 70 percent efficiency generates 18,378-watt hours per one gallon of propane fuel.

Referring to FIG. 12 of the drawings, is a theoretical computation of chemical formula of polymer-electrolyte membrane and matrix alkaline-electrolyte fuel cell efficiencies of the hydrogen gas generator when methanol fueled and air-oxidized. The theoretical weights or amounts of products and reactants used in carrying out the invention starts with one gallon of gasoline ($C_8H_{18}$) as a base line and 10.59 pounds of 60 percent hydrogen peroxide. The fuel and hydrogen peroxide are fed into the partial oxidizer chamber, and 0.80 gallons of water ($H_2O$) is fed into the steam reformer and its products of reaction are a pressurized fuel gas stream of 18.07 pounds of carbon dioxide ($CO_2$) and 2.12 pounds of hydrogen ($H_2$). The polymer-electrolyte membrane fuel cell at 45 percent efficiency generates 14,257-watt hours per one gallon of propane fuel. The circulating alkaline-electrolyte fuel cell at 70 percent efficiency generates 22,178-watt hours per one gallon of propane fuel.

Referring to FIG. 13 of the drawings, is a theoretical computation of chemical formula of polymer-electrolyte membrane and circulating alkaline-electrolyte fuel cell efficiencies of the hydrogen gas generator when methanol fueled and air-oxidized. The theoretical weights or amounts of products and reactants used in carrying out the invention starts with one gallon of kerosene ($C_{12}H_{26}$) as a base line and 40.83 pounds of air from the atmosphere. The fuel and air are fed into the partial oxidizer chamber, and 1.21 gallons of water ($H_2O$) is fed into the steam reformer and its products of reaction are a pressurized fuel gas stream of 19.38 pounds of carbon dioxide ($CO_2$) and 1.85 pounds of hydrogen ($H_2$). The polymer-electrolyte membrane fuel cell at 45 percent efficiency generates 12,423-watt hours per one gallon of propane fuel. The circulating alkaline-electrolyte fuel cell at 70 percent efficiency generates 19,324-watt hours per one gallon of propane fuel.

Referring to FIG. 14 of the drawings, is a theoretical computation of chemical formula of polymer-electrolyte membrane and matrix alkaline-electrolyte fuel cell efficiencies of the hydrogen gas generator when methanol fueled and air-oxidized. The theoretical weights or amounts of products and reactants used in carrying out the invention starts with one gallon of kerosene ($C_{12}H_{26}$) as a base line and 10.97 pounds of 60 percent hydrogen peroxide. The fuel and hydrogen peroxide are fed into the partial oxidizer chamber, and 0.87 gallons of water ($H_2O$) is fed into the steam reformer and its products of reaction are a pressurized fuel gas stream of 19.38 pounds of carbon dioxide ($CO_2$) and 2.26 pounds of hydrogen ($H_2$). The polymer-electrolyte membrane fuel cell at 45 percent efficiency generates 15,156-watt hours per one gallon of propane fuel. The circulating alkaline-electrolyte fuel cell at 70 percent efficiency generates 23,575-watt hours per one gallon of propane fuel.

Referring to FIG. 15 of the drawings, is a theoretical computation of chemical formula of polymer-electrolyte membrane and circulating alkaline-electrolyte fuel cell efficiencies of the hydrogen gas generator when methanol fueled and air-oxidized. The theoretical weights or amounts of products and reactants used in carrying out the invention starts with one gallon of ethanol ($C_2H_6O$) as a base line and 12.20 pounds of air from the atmosphere. The fuel and air are fed into the partial oxidizer chamber, and 0.55 gallons of water ($H_2O$) is fed into the steam reformer and its products of reaction are a pressurized fuel gas stream of 12.58 pounds of carbon dioxide ($CO_2$) and 1.37 pounds of hydrogen ($H_2$). The polymer-electrolyte membrane fuel cell at 45 percent efficiency generates 9,207-watt hours per one gallon of propane fuel. The circulating alkaline-electrolyte fuel cell at 70 percent efficiency generates 14,321-watt hours per one gallon of propane fuel.

Referring to FIG. 16 of the drawings, is a theoretical computation of chemical formula of polymer-electrolyte membrane and matrix alkaline-electrolyte fuel cell efficiencies of the hydrogen gas generator when methanol fueled and air-oxidized. The theoretical weights or amounts of products and reactants used in carrying out the invention starts with one gallon of ethanol ($C_2H_6O$) as a base line and 6.12 pounds of 60 percent hydrogen peroxide. The fuel and hydrogen peroxide are fed into the partial oxidizer chamber, and 0.36 gallons of water ($H_2O$) is fed into the steam reformer and its products of reaction are a pressurized fuel gas stream of 12.58 pounds of carbon dioxide ($CO_2$) and 1.46 pounds of hydrogen ($H_2$). The polymer-electrolyte membrane fuel cell at 45 percent efficiency generates 9,812-watt hours per one gallon of propane fuel. The circulating alkaline-electrolyte fuel cell at 70 percent efficiency generates 15,264-watt hours per one gallon of propane fuel.

Unfortunately, not all the power from the fuel cell FC comes out as useful electric power for performing desired work. Combustion and thermal inefficiencies cause loss of energy in the hydrogen fuel generator, chemical reaction losses, and fuel cell losses. Therefore, the power output of the hydrocarbon fueled, hydrogen fuel generator, and control system EVHG is equal to the theoretical power minus all the power losses.

Having described only typical preferred forms and applications of our invention, We do not wish to be limited to the specific details here in set forth but wish to reserve to ourselves any modifications and/or variations that might appears to those skilled in the art and that fall within the scope of the following claims.

Having described our invention, we claim:

1. A hydrogen fuel generator and fuel cell system and apparatus comprising a hydrocarbon fuel supply means; an oxidizer supply means; a water supply means; pump means connected with the fuel, oxidizer and water supply means; a thermally insulated high pressure elongate tank-like structure with upstream and downstream ends; a fuel and oxidizer mixing chamber at the upstream end of the tank-like structure and connected with the fuel and with the oxidizer pump means; an ignition chamber in the tank-like structure downstream from and receiving a fuel and oxidizer mixer from the mixing chamber; an ignition means operating to ignite the fuel and oxidizer mixture in the ignition chamber; a steam generating chamber in heat conducting relationship with the ignition chamber and connected with and receiving water from the water pump means; a pressure chamber in the tank-like structure down stream from the ignition and steam generating chambers and receiving the gases produced by oxidation of the fuel and the steam; a catalytic sulfur absorbing means in the tank-like structure downstream from and receiving gases and steam from the pressure chamber; a catalytic steam reformer means in the tank-like structure downstream from and receiving sulfur free gases and steam from the sulfur absorbing means and reforming carbon monoxide gas into carbon dioxide gas; a catalytic carbon monoxide scavenger means in the tank-like structure downstream from and receiving gases flowing from the steam reformer means and converting residual carbon monoxide to hydrogen and carbon dioxide gas; a collecting chamber in the tank-like structure downstream from the scavenger means and receiving hydrogen and carbon dioxide gas therefrom; heat exchange means downstream from and connected with the collecting chamber and operating to cool the high pressure heated gases flowing therefrom to cause the carbon dioxide gas to change to a liquid state; a liquid-gas separator means downstream from and connected with the heat exchange means, a liquid carbon dioxide holding tank and a hydrogen gas holding tank receiving liquid carbon dioxide and hydrogen gas from the liquid-gas separator means; a hydrogen fueled cell structure with an anode with related hydrogen gas feed means connected with the hydrogen holding tank and a cathode with related parts connected with an oxidizer feed means and with parts connected with and delivering water produced by fuel cell reaction to the water supply means.

2. The system and apparatus set forth in claim 1 that further includes an exhaust valve at the collecting chamber operating to open and exhaust products of oxidation of the fuel and operating to close when the pressure and temperature within the tank-like structure reach desired operating levels.

3. The system and apparatus set forth in claim 2 that further includes a water circulating heat exchanger device in the pressure chamber, a water circulating pump connected with the heat exchanging device and with the water supply means, a temperature responsive control means for the water circulating pump responsive to the temperature of the steam and gas in the pressure chamber and causing the pump to operate to maintain the temperature of the gases and steam in the pressure chamber at a preferred reaction temperature for sulfur absorption, steam reforming and carbon monoxide scavenging.

4. The system and apparatus set forth in claim 3 wherein the heat exchanger means includes an upstream heat exchanger and steam generating unit and a coolant water pump connected with and between the water supply means and the upstream heat exchanger unit and a downstream heat exchanger unit through which carbon dioxide coolant from the carbon dioxide holding tank is conducted to cool the hydrogen and carbon dioxide gases to a temperature at which the carbon dioxide changes a liquid state and separates from the hydrogen gas and steam from the heat exchanging devices.

5. The system and apparatus set forth in claim 1 that further includes a water circulating heat exchanger device in the pressure chamber, a water circulating pump connected with the heat exchanging device and with the water supply means, a temperature responsive control means for the water circulating pump responsive to the temperature of the steam and gas in the pressure chamber and causing the pump to operate to maintain the temperature of the gases and steam in the pressure chamber at a preferred reaction temperature for sulfur absorption, steam reforming and carbon monoxide scavenging.

6. The system and apparatus set forth in claim 5 wherein the heat exchanging means includes an upstream heat exchanger and steam generating unit and a coolant water pump connected with and between the water supply means and the upstream heat exchanger unit and a downstream heat exchanger unit through which carbon dioxide coolant from the carbon dioxide holding tank is conducted to cool the hydrogen and carbon dioxide gases to a temperature at which the carbon dioxide changes a liquid state and separates from the hydrogen gas.

7. The system and apparatus set forth in claim 1 wherein the several pump means are variable output gas operated pumps driven by carbon dioxide gas from the carbon dioxide holding tank and steam from the heat exchanging devices.

8. The system and apparatus set forth in claim 7 wherein the heat exchanger means includes an upstream heat exchanger and steam generating unit and a coolant water pump connected with and between the water supply means and the upstream heat exchanger unit and a downstream heat exchanger unit through which carbon dioxide coolant from the carbon dioxide holding tank is conducted to cool the hydrogen and carbon dioxide gases to a temperature at which the carbon dioxide changes a liquid state and separates from the hydrogen gas and steam from the heat exchanging devices.

9. The system and apparatus set forth in claim 1 wherein the heat exchanging means includes an upstream heat exchanger and steam generating unit and a coolant water pump connected with and between the water supply means and the upstream heat exchanger unit and a downstream heat exchanger unit through which carbon dioxide coolant from the carbon dioxide holding tank is conducted to cool the hydrogen and carbon dioxide gases to a temperature at which the carbon dioxide changes a liquid state and separates from the hydrogen gas.

10. The system and apparatus set forth in claim 1 wherein the oxidizer supply means includes an oxidizer supply tank in which the oxidizer hydrogen peroxide is stored.

11. The system and apparatus set forth in claim 1 wherein the sulfur absorbing means includes a porous gas conducting bed of metal oxide aerogel microspheres containing elements selected from cerium, zinc, strontium, magnesium, copper, lanthanum, barium, iron, yttrium, chromium, cobalt, vanadium, zirconium, and precious metals.

12. The system and apparatus set forth in claim 1 wherein the steam reformer means includes a porous gas conducting bed of metal aerogel microspheres containing elements selected from nickel, copper, zinc, iron, cobalt, zirconium, chromium, rare earth and precious metals.

13. The system and apparatus set forth in claim 1 wherein the carbon monoxide scavenger means includes a porous gas conducting bed of aerogel microspheres of mixed metal oxides $M_n$ oxides $O_n$ selected from nickel, manganese, tin, copper, silver, iron, zinc and/or chromium.

14. The system and apparatus set forth in claim 1 wherein the sulfur absorbing means includes a porous gas conducting bed of metal oxide aerogel microspheres containing elements selected from cerium, zinc, strontium, magnesium, copper, lanthanum, barium, iron, yttrium, chromium, cobalt, vanadium, zirconium, and precious metals; the steam reformer means includes a porous gas conducting bed of metal aerogel microspheres containing elements selected from nickel, copper, zinc, iron, cobalt, zirconium, chromium, rare earth and precious metals; the carbon monoxide scavenger means include a porous gas conducting bed of mixed metal oxides $M_n$ oxides $O_n$ selected from nickel, manganese, tin, copper, silver, iron, zinc and/or chromium.

* * * * *